(12) United States Patent
Kim et al.

(10) Patent No.: US 11,541,955 B2
(45) Date of Patent: Jan. 3, 2023

(54) MULTI-FUNCTIONAL LIGHTING DEVICE INTEGRATED WITH BICYCLE

(71) Applicants: Tae-Young Kim, Hanam-si (KR); Dong-Choon Koo, Seoul (KR)

(72) Inventors: Tae-Young Kim, Hanam-si (KR); Dong-Choon Koo, Seoul (KR)

( * ) Notice: Subject to any disclaimer, the term of this patent is extended or adjusted under 35 U.S.C. 154(b) by 192 days.

(21) Appl. No.: 17/056,708

(22) PCT Filed: May 28, 2018

(86) PCT No.: PCT/KR2018/006002
§ 371 (c)(1),
(2) Date: Nov. 18, 2020

(87) PCT Pub. No.: WO2019/225790
PCT Pub. Date: Nov. 28, 2019

(65) Prior Publication Data
US 2021/0214033 A1 Jul. 15, 2021

(30) Foreign Application Priority Data
May 24, 2018 (KR) .................. 10-2018-0059026

(51) Int. Cl.
*B62K 19/40* (2006.01)
*B62J 3/10* (2020.01)
(Continued)

(52) U.S. Cl.
CPC . *B62J 3/10* (2020.02); *B62J 3/04* (2020.02); *B62J 3/14* (2020.02); *B62J 6/029* (2020.02); *B62J 6/03* (2020.02); *B62J 27/00* (2013.01); *B62J 43/30* (2020.02); *B62J 45/10* (2020.02); *B62J 45/414* (2020.02); *B62J 45/415* (2020.02);
(Continued)

(58) Field of Classification Search
CPC ........ B62K 19/40; B62J 6/02; F21W 2107/13
See application file for complete search history.

(56) References Cited

U.S. PATENT DOCUMENTS 7,976,048 B2 * 7/2011 Bartolome ............... B62J 11/00
280/288.4
2009/0080207 A1 3/2009 Hurwitz

FOREIGN PATENT DOCUMENTS

| KR | 101032885 B1 | 5/2011 |
| KR | 101394698 B1 | 5/2014 |

(Continued)

OTHER PUBLICATIONS

International Search Report of PCT/KR2018/006002, dated Mar. 4, 2019, English translation.

*Primary Examiner* — Sean P Gramling
(74) *Attorney, Agent, or Firm* — STIP Law Group, LLC

(57) ABSTRACT

The present invention relates to a multifunctional lighting apparatus for a bicycle, which includes: a lighting apparatus ascending/descending support unit detachably mounted on a steering unit of a bicycle; an ascending/descending movement body part vertically movably located in the lighting apparatus ascending/descending support unit; and a main lighting lamp unit located in the ascending/descending movement body part and irradiating light, and as a result, a lighting lamp unit can be located at a position desired by a driver by adjusting a height of the lighting lamp unit, thereby enhancing both satisfaction and safety in use.

25 Claims, 12 Drawing Sheets

(51) Int. Cl.

| | |
|---|---|
| *F21S 41/55* | (2018.01) |
| *B62J 45/10* | (2020.01) |
| *B62J 3/04* | (2020.01) |
| *B62J 3/14* | (2020.01) |
| *B62J 45/42* | (2020.01) |
| *B62J 45/414* | (2020.01) |
| *F21S 9/02* | (2006.01) |
| *G01C 19/00* | (2013.01) |
| *B62J 43/30* | (2020.01) |
| *B62J 45/415* | (2020.01) |
| *B62J 6/029* | (2020.01) |
| *B62J 6/03* | (2020.01) |
| *B62J 27/00* | (2020.01) |
| *F21W 107/13* | (2018.01) |

(52) U.S. Cl.
CPC ............... *B62J 45/42* (2020.02); *B62K 19/40* (2013.01); *F21S 9/02* (2013.01); *F21S 41/55* (2018.01); *G01C 19/00* (2013.01); *F21W 2107/13* (2018.01)

(56) References Cited

FOREIGN PATENT DOCUMENTS

| KR | 101630170 B1 | | 6/2016 |
|---|---|---|---|
| KR | 101641510 B1 | | 7/2016 |
| KR | 20160100810 A | | 8/2016 |
| KR | 101696244 B1 | * | 1/2017 |
| KR | 101696244 B1 | | 1/2017 |

\* cited by examiner

MULTI-FUNCTIONAL LIGHTING DEVICE INTEGRATED WITH BICYCLE

CROSS-REFERENCE TO RELATED APPLICATIONS

This application is the U.S. National Phase under 35 U.S.C. § 371 of International Application No. PCT/KR2018/006002 filed on May 28, 2018, which in turn claims the benefit of Korean Application No. 10-2018-0059026 filed on May 24, 2018, the disclosures of which are incorporated by reference into the present application.

TECHNICAL FIELD

The present invention relates to a multifunctional lighting apparatus for a bicycle, and more particularly, to a multifunctional lighting apparatus for a bicycle, which is selectively mounted on a handle of the bicycle to ensure visibility during night driving and take advantage of assistive devices such as a Bluetooth speak body, a gyro sensor body, etc. This application claims priority to and the benefit of Korean Patent Application No. 10-2018-0059026 filed in the Korean Intellectual Property Office on May 24, 2018, the entire contents of which are incorporated herein by reference.

BACKGROUND ART

In general, bicycles are used as a movement means on or a transportation means, as well as are used a lot as an economical and efficient exercise means.

In recent years, while the well-being boom with the unique age is a trend that the population using bicycles at night, as well as the daytime, the trend is rapidly increasing, and thus overflowing with various auxiliary supplies to pursue practical and convenience in bicycle life with the need for the lighting apparatus of the bicycle, but in the utilization, the uncomfortable elements that need to be improved remain everywhere.

In conventional bicycles, a separate headlight required for a night-time operation should be provided and mounted on a bicycle handle. In the case of the conventional headlight, a conventional flashlight is mounted on the bicycle handle and used by means of various holding devices, but as a specification is different according to the type of handlebar and handles of a majority of high-end bicycles are formed in a tapping shape in which thicknesses of both center portions and outer portions are different, there are a problem of removal such as occurrence of a clearance during driving and a problem that a position or direction of the headlight is not fixed as intended and there is a limit even in attachment of multiple bicycle convenience equipment, and as a result, there is a problem that various convenience requirements of a driver cannot be satisfied.

As prior art related to the present invention, Korean Patent Registration No. 1032885 'Bicycle Lighting Apparatus' is proposed.

Korean Patent Registration No. 1032885 'Bicycle Lighting Apparatus' has a problem that due to a feature that since light emitted by an LED module is reflected at specific angles through a plurality of reflection surfaces, respectively, efficiency of light and visibility securing are enhanced, the bicycle light apparatus has only a function to light up a road during night-time driving.

Further, Korean Patent Registration No. 1032885 'Bicycle Lighting Apparatus' has a problem that since the lighting apparatus is fixed to the handle bar of the bicycle by a fixing equipment, height control is impossible, and as a result, a lighting position is limited.

DISCLOSURE

Technical Problem

An object to be solved by the present invention is to provide a multifunctional lighting apparatus for a bicycle, which may be selectively mounted on a handle stem of the bicycle and is capable of adjusting a height.

Another object to be solved by the present invention is to provide a multifunctional lighting apparatus for a bicycle, which may provide a function as a headlight for the bicycle simply mounted on an ahead handle stem standardized in all bicycles over the world except for some low-cost life bicycles by using a 6 mm-wrench bolt of the existing specification, in which an anti-glare shade for preventing glaring of an opponent during night crossing on a bicycle road is made of opaque embossed polycarbonate, and serves as an upper light shielding of dimming due to a bonding effect of a mirror reflection film on an outer wall and provides an effect of increasing a light amount downward, provides a strong side safety lamp function to a bicycle which progresses in a crossing direction due to a white light source which comes out from the polycarbonate material and the mirror reflection film, provide an optimal light source for securing safety visibility of a driver during night-time driving, and provide a function of air resistance reduction.

Yet another object to be solved by the present invention is to provide a multifunctional lighting apparatus for a bicycle, which may stably hold a cellular phone and charge the held cellular phone with an embedded rechargeable battery.

Still yet another object to be solved by the present invention is to provide a multifunctional lighting apparatus for a bicycle, in which a brake is actuated according to a surrounding environment during driving in link with a gyro sensor body and a warning sound and a warning lamp are actuated when a driver bows or tilts a head a little while wearing a helmet to achieve safety driving of the driver himself/herself and surrounding drivers.

Still yet another object to be solved by the present invention is to provide a multifunctional lighting apparatus for a bicycle, which may selectively link and mount a Bluetooth speaker body and supply power to the Bluetooth speaker body with an embedded rechargeable battery.

Still yet another object to be solved by the present invention is to provide a multifunctional lighting apparatus for a bicycle, in which all bicycle comforts having various bicycle supply specifications and different mounting schemes may be easily mounted on one place through a multi-extension arm member which may be tilted, pivoted, and swung during driving the bicycle and all comforts may be safely stored by removing a knob-type handle bolt in a convenient sliding scheme only by releasing the knob-type handle bolt with a hand by solving an inconvenience problem that the comforts should be removed one by one due to a problem in safety management after driving to resolve a problem of theft and damage of the comforts.

Still yet another object to be solved by the present invention is to provide a multifunctional lighting apparatus for a bicycle, which may use the multifunctional lighting apparatus for the bicycle linked with a Bluetooth speaker body for multi purposes by using a support body capable of simply installing the multifunctional lighting apparatus for the bicycle linked with the Bluetooth speaker body in a tent, a tarp, a parasol support pipe, or a vehicle in camping or outdoor activities.

Technical Solution

In order to solve the problem, an embodiment of a multifunctional lighting apparatus for a bicycle according to the present invention includes: a lighting apparatus ascending/descending support unit detachably mounted on a steering unit of a bicycle; an ascending/descending movement body part vertically movably located in the lighting apparatus ascending/descending support unit; and a main lighting lamp unit located in the ascending/descending movement body part and irradiating light.

In the present invention, the lighting apparatus ascending/descending support unit may include a bicycle handle stem mounting member detachably mounted on a stem of the steering unit and a frame member rotatably located in the bicycle handle stem mounting member and erected and laid down and movably coupled with the ascending/descending movement body part, a main mounting hole penetrated by a stem mounting bolt fastened to the stem may be located in the bicycle handle stem mounting member, and the main mounting hole has the same diameter as the stem mounting bolt and may be formed by a fastening hole in which female thread tapping which may be fastened to a camera coupling bolt of a camera tripod is formed.

In the present invention, a rechargeable battery supplying power to the main lighting lamp unit may be located in the ascending/descending movement body part.

In the present invention, a handle lighting lamp unit irradiating the light to the steering unit may be provided in the ascending/descending movement body part.

In the present invention, the multifunctional lighting apparatus for a bicycle may further include a Bluetooth speaker body detachably coupled to the ascending/descending movement body part.

In the present invention, rechargeable battery supplying power to the main lighting lamp unit may be located in the ascending/descending movement body part, and the Bluetooth speaker body may be coupled to the ascending/descending movement body part and electrically connected to the rechargeable battery to receive the power from the rechargeable battery.

In the present invention, a sound lighting unit which emits light in response to an output sound may be located in the Bluetooth speaker body, and the sound lighting unit may be a spectrum lighting emitting the light in a wave form in response the sound.

In the present invention, a coupling portion to which the lighting apparatus ascending/descending support unit is detachably coupled may be located on a front surface of the ascending/descending movement body part, an ascending/descending movement path to which the lighting apparatus ascending/descending support unit is movably coupled in a vertical direction may be located in the coupling portion, and an opening portion for exposing a part of the lighting apparatus ascending/descending support unit moved on the ascending/descending movement path may be located on the front surface, and the Bluetooth speaker body may be inserted into the opening portion and coupled to the ascending/descending movement body part.

In the present invention, a Bluetooth coupling protrusion portion may be located to protrude on any one side of an inner surface of the opening portion and an outer surface of the Bluetooth speaker body and a Bluetooth coupling groove portion into which the Bluetooth coupling protrusion portion is inserted and suspended may be located on the other side of the inner surface of the opening portion and the outer surface of the Bluetooth speaker body.

In the present invention, the multifunctional lighting apparatus for a bicycle may further include a speaker fixation bolt fastened to a fastening hole slantly located in the ascending/descending movement body part and slantly located and pressing the outer surface of the Bluetooth speaker body coupled to the opening portion to fix a position of the Bluetooth speaker body.

In the present invention, in the Bluetooth speaker body, a Bluetooth power supply first terminal may be located on the outer surface and a Bluetooth power supply second terminal connected to the Bluetooth power supply first terminal and connecting the power of the rechargeable battery located in the ascending/descending movement body part to the Bluetooth speaker body may be located on the inner surface of the opening portion.

In the present invention, a power supply terminal of an auxiliary lighting lamp may be located in the Bluetooth speaker body, and the power supply terminal of the auxiliary lighting lamp may be connected to the rechargeable battery through the Bluetooth power supply first terminal and selectively supply the power to an auxiliary lighting lamp unit from the rechargeable battery by a control of an auxiliary lighting lamp control remote controller.

An embodiment of the multifunctional lighting apparatus for a bicycle according to the present invention may further include a cellular phone holding unit located in the ascending/descending movement body part, and the cellular phone holding unit may include a plurality of line members having elasticity so as to hang and support a cellular phone.

In the present invention, the cellular phone holding unit may include a first elastic line member of which one end is connected to an upper portion side of the ascending/descending movement body part and the other end is connected to one side of the ascending/descending movement body part, a second elastic line member of which one end is connected to the upper portion side of the ascending/descending movement body part and the other end is connected to the other side of the ascending/descending movement body part, a third elastic line member of which one end is connected to a lower portion side of the ascending/descending movement body part and the other end is connected to one side of the ascending/descending movement body part, a fourth elastic line member of which one end is connected to the lower portion side of the ascending/descending movement body part and the other end is connected to the other side of the ascending/descending movement body part, and a cellular phone holding coupling member which is connected to one end of each of the third elastic line member and the fourth elastic line member and detachably coupled to the ascending/descending movement body part.

In the present invention, a portable holding locking member insertion groove into which the cellular phone holding coupling member is inserted and coupled may be located on a lower surface of the ascending/descending movement body part, and a suspension protrusion portion may be located to be projected on at one side of the inner surface of the cellular phone holding locking member insertion groove and the outer surface of the cellular phone holding coupling member and a suspension groove portion into which the suspension protrusion portion is inserted and suspended may be located on the other side of the inner surface of the cellular phone holding locking member insertion groove and the outer surface of the cellular phone holding coupling member.

In the present invention, the cellular phone holding unit may further include a first cellular phone holding rotation arm member rotatably located on one surface of the ascending/descending movement body part and connected to each of the other end of the first elastic line member and the other end of the third elastic line member, and a second cellular phone holding rotation arm member rotatably located on the other surface of the ascending/descending movement body part and connected to each of the other end of the second elastic line member and the other end of the fourth elastic line member.

An embodiment of the multifunctional lighting apparatus for a bicycle according to the present invention may further include an arm part on which the auxiliary lighting lamp unit or another accessory equipment may be mounted and which is removably coupled to the ascending/descending movement body part.

In the present invention, the arm part may include a first arm member rotatably axially coupled to a side surface of the ascending/descending movement body part or the Bluetooth speaker body by a first hinge shaft and a second arm member rotatably connected to the first arm member by a second hinge axis located in a different direction from the first hinge shaft, a holder stopper unit supporting one side of an auxiliary lighting lamp unit holder coupled to the second arm member and supporting one side of an auxiliary lighting lamp unit holder to which an auxiliary lighting lamp unit may be coupled may be located on one side of the second arm member, and the arm part may further include a holder pressing member located on the other side of the second arm member and pressing the other side of the auxiliary lighting lamp unit holder to fix the position, and a holder fixing bolt member fastened to the second arm member through the holder pressing member.

In the present invention, the first hinge shaft may be a hinge shaft bolt which protrudes on one side of the first arm member and fastened a bolt fastening portion located on the side surface of the ascending/descending movement body part or the side surface of the Bluetooth speaker body, and in the first arm member, the hinge shaft bolt may be located and a bolt fastening space opened to the other side may be located and the bolt fastening space may be opened by rotating the second arm member.

An embodiment of the multifunctional lighting apparatus for a bicycle according to the present invention may further include: a gyro sensor body which includes a gyro sensor capable of sensing an inclination angle therein and which may be worn by a driver of the bicycle; a warning sound speaker unit which is located in the ascending/descending movement body part and communicates with the gyro sensor body and receives an angle change sensed by the gyro sensor body and outputs a warning sound; and an emergency lamp unit which is located in the ascending/descending movement body part and communicates with the gyro sensor body and receives the angle change sensed by the gyro sensor body and emits the light.

In the present invention, in the gyro sensor body, the gyro sensor may be located to be biased to one side in the longitudinal direction of a housing and a sensor horizontal position display groove portion displaying a place where the gyro sensor may be located is located on the outer surface of the housing.

An embodiment of the multifunctional lighting apparatus for a bicycle according to the present invention may further include a sensor wearing member to which the gyro sensor body is rotatably and removably coupled and in which an elastic wearing band to be worn in the figure of the driver is provided, and in the sensor wearing member, an arc-shaped finger seating groove portion which may be seated on the finger may be located on the lower surface.

An embodiment of the multifunctional lighting apparatus for a bicycle according to the present invention may further include a pipe holding unit for mounting the Bluetooth speaker body on the support pipe of the tent or tarp.

In the present invention, the pipe holding unit may include a pipe holding body member in which an arc-shaped pipe mounting groove portion covering a part of the outer surface of the support pipe and the Bluetooth speaker body is removably mounted, a first elastic line suspension member which protrudes on one surface of the pipe holding body member and is located to be erected in the vertical direction, a second elastic line suspension member 930 which protrudes on the other surface of the pipe holding body member 910 and is located to be erected in the vertical direction, and a pipe fixing line member which is suspended on the first elastic line suspension member and the second elastic line suspension member and fixes the pipe holding body member to the support pipe by covering the remaining part of the outer surface of the support pipe.

An embodiment of the multifunctional lighting apparatus for a bicycle according to the present invention may further include a folding-type non-contact magnetic holder which may attach and use the Bluetooth speaker body by a magnetic force, in the present invention, a folding-type non-contact magnetic holder may include a base member in which a plurality of bolt penetration holes through which the speaker mounting bolt is penetrated is located to be spaced apart from each other, a first rotation member and a second rotation member rotatably connected to the base member, a magnetic attachment member which is located in each of the base member, the first rotation member, and the second rotation member and includes a magnet to be attached by the magnetic force, and an elastic-material elastic support ring member which is located on the lower surface of the magnetic attachment member to separate the lower surface of the magnetic attachment member from an attachment surface.

In the present invention, a wireless control receiving window which receives a transmission signal from the auxiliary lighting lamp control remote controller and controls actuation of the auxiliary lighting lamp unit may be located in the Bluetooth speaker body.

Advantageous Effects

According to the present invention, there is an effect that a multifunctional lighting apparatus can be selectively mounted on a handle stem of a bicycle and a lighting lamp unit can be located at a position desired by a driver by adjusting an ascending/descending height of the lighting lamp unit, thereby enhancing both satisfaction and safety in use.

According to the present invention, there is an effect that since a cellular phone can be stably held without flowing during bicycle driving and the held cellular phone can be charged with an embedded rechargeable battery, both the convenience and the stability can be enhanced when using the cellular phone.

According to the present invention, there is an effect that when a brake is actuated during driving in link with a gyro sensor body or a driver bows or tilts a head a little, an emergency lamp or a warning sound significantly enhances the stability while driving.

According to the present invention, there is an effect that since a Bluetooth speaker body can be selectively mounted and used and power can be supplied to the Bluetooth speaker body with an embedded rechargeable battery, satisfying various requirements of the driver.

According to the present invention, there is an effect that an assistive lighting lamp is added to the lighting apparatus linked with the Bluetooth speaker body outdoors like camping by using the Bluetooth speaker support body which can simply install the Bluetooth body in a support pipe of a tent or tarp used for the camping or a vehicle is used for multiple purposes, thereby maximizing convenience of a user.

MODE FOR INVENTION

The present invention will be described below in detail with reference to the accompanying drawings. Herein, the repeated description and the detailed description of publicly-known function and configuration that may make the gist of the present invention unnecessarily ambiguous will be omitted. Embodiments of the present invention are provided for more completely describing the present invention to those skilled in the art.

Figure 1:
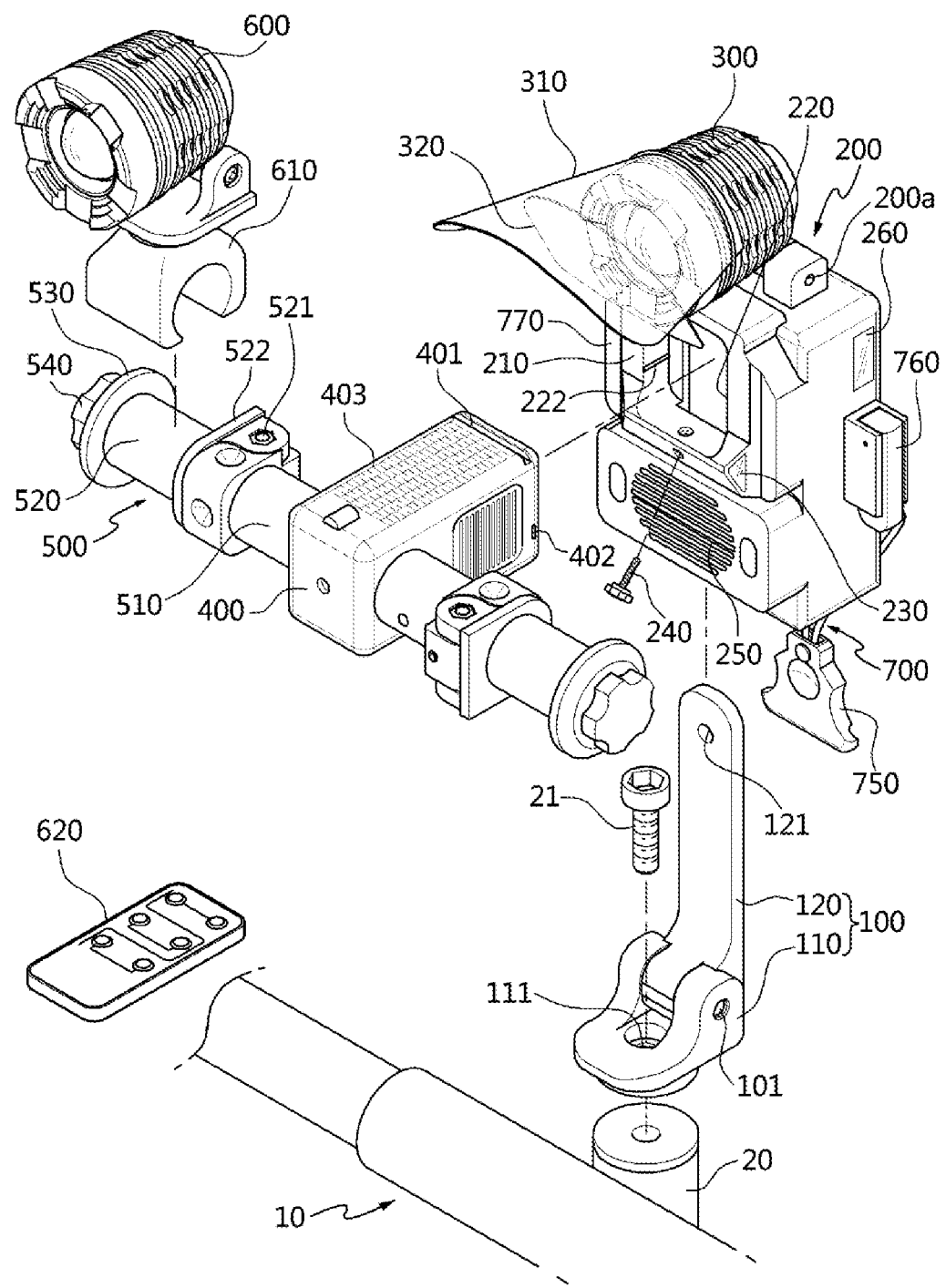
FIG. 1 is an exploded perspective view illustrating an embodiment of a multifunctional lighting apparatus for a bicycle according to the present invention.
Figure 2:
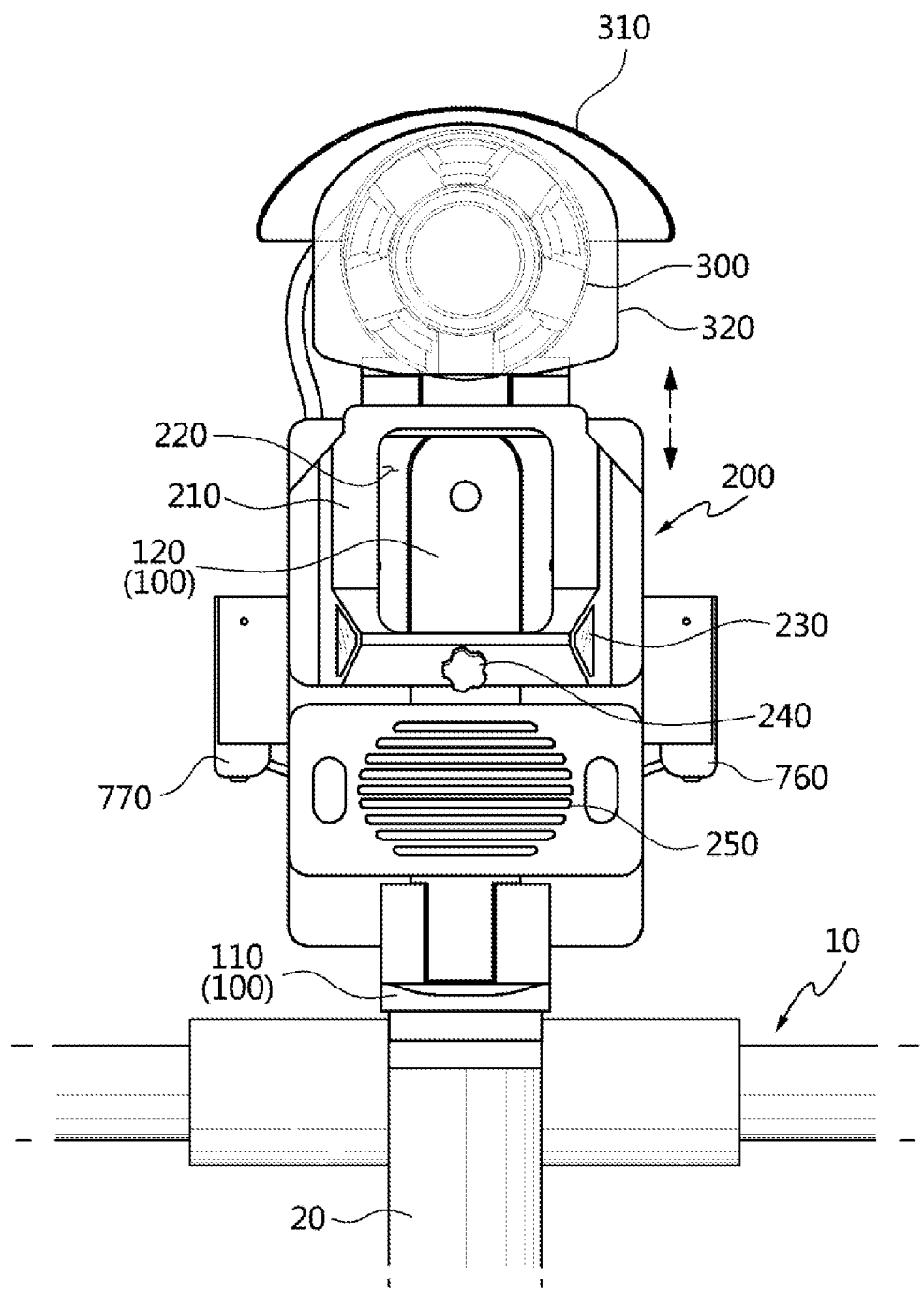
FIG. 2 is a plan view illustrating an actuation example of an ascending/descending movement body part in the multifunctional lighting apparatus for a bicycle according to the present invention.
Figure 3:
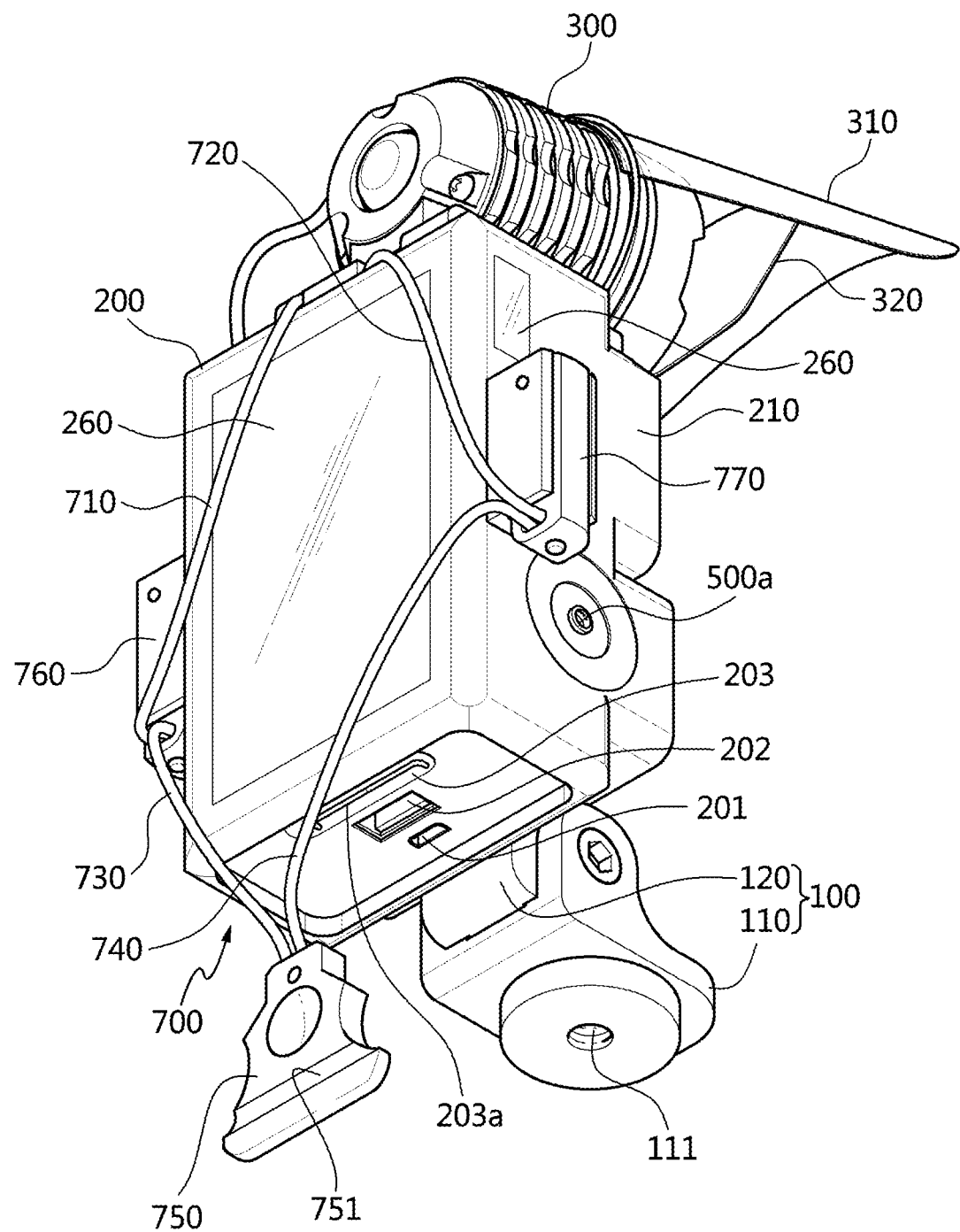
FIG. 3 is a bottom perspective view of the ascending/descending movement body part in the multifunctional lighting apparatus for a bicycle according to the present invention.

FIG. 1 is an exploded perspective view illustrating an embodiment of a multifunctional lighting apparatus for a bicycle according to the present invention, FIG. 2 is a plan view illustrating an actuation example of an ascending/descending movement body part 200 in the multifunctional lighting apparatus for a bicycle according to the present invention, and FIG. 3 is a bottom perspective view of the ascending/descending movement body part 200 in the multifunctional lighting apparatus for a bicycle according to the present invention.

Referring to FIGS. 1 to 3, an embodiment of the multifunctional lighting apparatus for a bicycle according to the present invention will be described below in detail.

The multifunctional lighting apparatus for a bicycle according to the present invention includes a lighting apparatus ascending/descending support unit 100 detachably mounted on a steering unit 10 of the bicycle.

An ascending/descending movement body part 200 is movably located in the lighting apparatus ascending/descending support unit 100 and a main lighting lamp unit 300 for irradiating in a driving direction of the bicycle is located in the ascending/descending movement body part 200.

A case where a front surface of the ascending/descending movement body part 200 is the driving direction of the bicycle or the lighting direction of the main lighting lamp unit 300 is taken as an example, which will be described below.

A lighting apparatus hinge portion 200a to which the main lighting lamp unit 300 is connected to be vertically rotated is located on an upper portion of the ascending/descending movement body part 200 to change the irradiation direction of the light.

An axial direction of the lighting apparatus hinge portion 200a is located in a width direction of the ascending/descending movement body part 200, i.e., in a horizontal direction which is vertical to the driving direction of the bicycle to rotate the main lighting lamp unit 300 in a vertical direction.

The main lighting lamp unit 300 is rotated around the lighting apparatus hinge portion 200a in the vertical direction and adjusted at an angle desired by the driver to change the irradiation direction of the light.

An anti-glare shade 310 may be located at an upper side of the main lighting lamp unit 300 and an air resistance reduction light diffusion lens 320 may be located on the front surface of a light source generating the light.

The main lighting lamp unit 300 generally emits white light, but is not limited thereto and may emit multiple colors. The main lighting lamp unit 300 may receive power from a rechargeable battery (not illustrated) located in the ascending/descending movement body part 200 and emit the light.

As the light source of the main lighting lamp unit 300, for example, a light emitting diode (LED) may be used.

However, the present invention is not particularly limited thereto and the light source of the main lighting lamp unit 300 may autonomously emit the light and receive the power through autonomous power generation of the bicycle.

The anti-glare shade 310 is a type in which a top of the main lighting lamp unit 300 covers in an arch shape and in FIG. 1, it is illustrated that the anti-glare shade 310 covers approximately a half of a circumference of the main lighting lamp unit 300, but is not particularly limited thereto.

The anti-glare shade 310 may adopt an opaque white embossed polycarbonate material, and a mirror reflection film is bonded to an outer wall to perform an upper light shielding function of the light generated from the main lighting lamp unit 300 and provide an effect of diffusing and increasing a reflection light amount downward and provide visibility for separate convenience equipments (accessory equipments) mounted on an arm part 500 coupled to the Bluetooth speaker body 400.

Further, the anti-glare shade 310 provides a function of a strong side safety lamp which allows the driver of the bicycle which progresses in a crossing direction to recognize white light which comes out from the polycarbonate material and the mirror reflection film.

The air resistance reduction light diffusion lens 320 located on the front surface of the main lighting lamp unit 300 diffuses the light generated from the main lighting lamp unit 300 to prevent an irradiated light from being biased like a headlight of the vehicle during night-time driving, thereby providing an optimal light for ensuring safety visibility of the driver and is coupled to a center bottom of the anti-glare shade 310 located on the top of the main lighting lamp unit 300 in a clip form and located in a streamlined shape approximately at 45 degrees when viewed from the side to reduce air resistance.

The lighting apparatus ascending/descending support unit 100 may include a bicycle handle stem mounting member 110 detachably mounted on the steering unit 10 and a frame member 120 which is rotatably located in the bicycle handle stem mounting member 110 and erected or laid and to which the ascending/descending movement body part 200 is movably coupled.

The frame member 120 is connected to a frame hinge portion 101 having a bolt structure on the bicycle handle stem mounting member 110 and the frame hinge portion 101 is fastened to fix the position of the rotated frame member 120 and the frame hinge portion 101 having the bolt structure is released to adjust a rotational angle of the frame member 120 as an example.

The frame hinge portion 101 adjusts the rotational angle to adjust an angle at which the light the main lighting lamp unit 300 is irradiated.

That is, the main lighting lamp unit 300 may adjust the angle of the light irradiated from the light source to the frame hinge portion 101 and the lighting apparatus hinge portion 101 to more various angles.

The bicycle handle stem mounting member 110 is detachably mounted on a stem 20 of the bicycle as an example.

The frame member 120 may be rotated around the frame hinge portion in forward and backward directions. The frame member 120 is laid down and located in an unused state, i.e., in a state in which the ascending/descending movement body part 200 is separated.

In addition, while the lighting apparatus ascending/descending support unit 100 is maintained while being mounted on the steering unit 10, i.e., the stem 20 and the ascending/descending movement body part 200 is separated, the lighting apparatus ascending/descending support unit 100 may be folded and stored and when the lighting apparatus ascending/descending support unit 100 is coupled with the ascending/descending movement body part 200, the lighting apparatus ascending/descending support unit 100 may be erected and located.

A stem mounting bolt 21 of a standard specification is located in the stem 20 of the bicycle and the stem mounting bolt 21 as a 6-mm wrench bolt is a standard specification of the bicycle.

The stem mounting bolt 21 is exposed by removing a washer-type cap and a 6-mm specification main mounting hole 111 which the stem mounting bolt 21 penetrates is located in the bicycle handle stem mounting member 110.

In this case, a diameter (inner diameter) of the main mounting hole 111 is preferably the same as a diameter (an outer diameter based on a male thread) of the stem mounting bolt 21.

A head portion of the stem mounting bolt 21 penetrating the main mounting hole 111 and fastened to the stem 20 of the bicycle is pressed to the top, and as a result, the bicycle handle stem mounting member 110 may be mounted on the stem 20 of the bicycle.

The stem mounting bolt 21 penetrates the main mounting hole 111 and the main mounting hole 111 is formed as a fastening hole in which tapping of a ¼-inch specification female thread which may be fastened to a camera coupling bolt of camera tripods as an example.

That is, the stem mounting bolt 21 penetrates the lighting apparatus ascending/descending support unit 100 and the main mounting hole 111 which may be fastened to the camera coupling bolt of the camera tripods is located to be detachably mounted on the stem 20 of the bicycle body by the stem mounting bolt 21 and mounted and held on the camera tripods through the coupling bolt of the camera tripods.

The camera coupling bolt of the camera tripods is fastened to a position of the bottom of the camera with a standardized bolt and has a specification of ¼ inch.

That is, since the camera coupling bolt has a diameter slightly larger than the stem mounting bolt 21 of 6 mm, a ¼-inch specification female thread is tapped in the main mounting hole 111 fastened to the camera coupling bolt, but the inner diameter has a diameter of 6 mm, and as a result, the stem mounting bolt 21 may be fastened and mounted onto the stem 20 of the bicycle by penetrating the main mounting hole 111.

Accordingly, since the multifunctional lighting apparatus for a bicycle according to the present invention is usable while being mounted on the camera tripods, the multifunctional lighting apparatus for a bicycle may be easily used with the camera tripods as a holder indoors or outdoors, in particular, outdoors.

Meanwhile, a coupling portion 210 to which the bicycle handle stem mounting member 110 is detachably coupled is located on the front surface of the ascending/descending movement body part 200, and an ascending/descending movement path to which the bicycle handle stem mounting member 110 is movably coupled in the vertical direction is located in the coupling portion 210 and an opening portion 220 for exposing a part of the bicycle handle stem mounting member 110 which moves to the ascending/descending movement path is located on the front surface.

That is, the frame member 120 is coupled to the ascending/descending movement path to move vertically and a part of the frame member 120 is located to be exposed to the opening portion 220.

The opening portion 220 exposes a part of the frame member 120 which moves through a frame movement path and is formed in a size and a shape in which a Bluetooth speaker body 400 to be described below may be inserted.

In addition, a detachment prevention safety suspension groove 121 to which a position fixing set screw is fastened is located in the frame member 120.

The frame member 120 is vertically moved through the frame movement path and a part is opened through the opening portion 220 to expose the detachment prevention safety suspension groove 121.

The ascending/descending movement body part 200 is guided and vertically moved by the frame member 120 coupled through the frame movement path and a knob-type speaker fixation bolt 240 for closely attaching the Bluetooth speaker body 400 to the ascending/descending movement body part 200 is inserted into the detachment prevention safety suspension groove 121 exposed through the opening portion 220 and tightened to fix the ascending/descending movement body part 200 to a predetermined ascending/descending position and the detachment prevention safety suspension groove 121 has a function as a dual safety device for preventing detachment of the ascending/descending movement body part 200.

Further, a rechargeable battery for supplying power to the main lighting lamp unit 300 may be positioned in the ascending/descending movement body part 200 and a lighting apparatus battery charging terminal 201 capable of charging a rechargeable battery (not illustrated) may be located in the ascending/descending movement body part 200.

The rechargeable battery is a rechargeable battery capable of high-performance rapid charging and includes a low-voltage overcharge protection circuit as an example.

Further, a portable device charging power terminal 202 which is connected to a charging cable to use an internal rechargeable battery as an auxiliary battery may be located in the ascending/descending movement body part 200 and the portable device charging power terminal 202 is a USB terminal as an example.

The rechargeable battery is connected to a portable electronic device such as a cellular phone through a charge cable connected to the portable device charging power terminal 202 to charge a portable electronic device such as the cellular phone with the rechargeable battery.

The main lighting lamp unit 300 is connected to the rechargeable battery by an electric wire and receives the power from the rechargeable battery to be turned on/off by a switch provided in the main lighting lamp unit 300 itself.

Further, a handle lighting lamp unit 230 for irradiating the light to the steering unit 10 of the bicycle may be provided in the ascending/descending movement body part 200.

The handle lighting lamp unit 230 is located on each of an inclined surface located at each of both sides of a lighting mounting portion which protrudes on the front surface of the ascending/descending movement body part 200 as an example.

The handle lighting lamp unit 230 irradiates the light to the steering unit 10 of the bicycle to identify a convenience equipment mounted on the handle of the bicycle, i.e., a separate convenience equipment such as a cellular phone holder mounted on the handle.

A first on/off switch for turning on/oft the main lighting lamp unit 300 and a second on/off switch for turning on/off the handle lighting lamp unit 230 may be located in the ascending/descending movement body part 200 and both the main lighting lamp unit 300 and the handle lighting lamp unit 230 may be turned on/off by one on/off switch.

The Bluetooth speaker body 400 may be detachably coupled to the ascending/descending movement body part 200.

The Bluetooth speaker body 400 is connected to the portable electronic device such as the cellular phone by a Bluetooth wireless scheme and used as a speaker.

The Bluetooth speaker body 400 is removably coupled to the opening portion 220 as an example.

A part at an end portion of the Bluetooth speaker body 400 is inserted into the opening portion 220 and coupled to the ascending/descending movement body part 200.

A Bluetooth coupling protrusion 221 is located to protrude on any one side of an inner surface of the opening portion 220 and an outer surface of the Bluetooth speaker body 400 and a Bluetooth coupling groove portion 401 into which the Bluetooth coupling protrusion 221 is inserted is located on the other side of the inner surface of the opening portion 220 and the outer surface of the Bluetooth speaker body 400.

The Bluetooth coupling protrusion 221 is located on the inner surface of the opening portion 200 and the Bluetooth coupling groove portion 401 is located on the outer surface of the Bluetooth speaker body 400 as an example.

Further, a coupling state of the Bluetooth speaker body 400 may be more robustly fixed by a speaker fixation bolt 240 fastened to the ascending/descending movement body part 200.

A Bluetooth coupling fastening hole 400a to which a speaker fixation bolt 240 may be fastened may be located in the Bluetooth speaker body 400. The Bluetooth coupling fastening hole 400a may be confirmed in FIG. 10. The speaker fixation bolt 240 is fastened to the Bluetooth coupling fastening hole 400a located on the outer surface of the Bluetooth speaker body 400 coupled to the opening portion 220 while slantly inserted into a fastening hole slantly formed in the ascending/descending movement body part 200 to robustly fix the position of the Bluetooth speaker body 400.

The speaker fixation bolt 240 fixes the position of the Bluetooth speaker body 400 while being slantly fastened and the Bluetooth speaker body 400 presses the frame member 120 to more robustly fix the position of the frame member 120, i.e., the height of the ascending/descending movement body part 200.

Further, the speaker fixation bolt 240 is fastened to the ascending/descending movement body part 200 while the Bluetooth speaker body 400 is separated and presses the frame member 120 to be used so as to robustly fix the position of the frame member 120, i.e., the height of the ascending/descending movement body part 200.

In the Bluetooth speaker body 400, a Bluetooth power supply first terminal 402 is located on the outer surface and a Bluetooth power supply second terminal 222 connected the Bluetooth power supply first terminal 402 and connecting the rechargeable battery to the Bluetooth speaker body 400 is located on the inner surface of the opening portion 220.

When the Bluetooth speaker body 400 is inserted and coupled into the opening portion 220, the Bluetooth power supply first terminal 402 may supply the power to the Bluetooth speaker body 400 through the rechargeable battery while being connected to the Bluetooth power supply second terminal 222.

Further, a wireless control receiving window 630 of an auxiliary lighting lamp power supply terminal is located in the Bluetooth speaker body 400.

The wireless control receiving window 630 receives a transmission signal from an auxiliary lighting lamp control remote controller 620 to be described below to control actuation (on/off, light amount control, and strobo on/off) of the auxiliary lighting lamp unit 600.

When the Bluetooth speaker body 400 is inserted and coupled into the opening portion 220, the Bluetooth power supply first terminal 402 may be actuated by receiving the power from the rechargeable battery while being connected to the Bluetooth power supply second terminal 222.

The auxiliary lighting lamp unit 600 mounted on the bicycle and used or the arm part 500 capable of mounting another accessory equipment may be located in the Bluetooth speaker body 400.

The arm part 500 is located on each of both sides of the Bluetooth speaker body 400 as an example.

The arm part 500 is axially coupled to be rotatable on a first hinge shaft 511 is axially coupled to the side of the Bluetooth speaker body 400 as an example.

Further, the arm part 500 may include a first arm member 510 axially coupled to be rotatable on the first hinge shaft 511 on the side of the Bluetooth speaker body 400 and a second arm member 520 connected to be rotatable on a second hinge shaft 521 located in a different direction from the first hinge shaft 511 in the first arm member 510.

The first hinge shaft 511 is a hinge shaft in which a vertical direction on the side of the Bluetooth speaker body 400, i.e., a longitudinal direction of the arm part 500 is the axial direction and the second hinge shaft 521 is a hinge shaft located in a vertical direction to the first hinge shaft 511, as an example.

An auxiliary lighting lamp unit holder 610 to which a separate accessory equipment or a separate auxiliary lighting lamp unit 600 may be coupled to the second arm member 520 and used.

The auxiliary lighting lamp unit 600 may integrally include the auxiliary lighting lamp unit holder 610 which may be removably coupled to the second arm member 520 or coupled to the second arm member 520 through the auxiliary lighting lamp unit holder 610 and used.

As the equipment which may be coupled to the second arm member 520, the auxiliary lighting lamp unit 600 is an example and besides, a known bicycle accessory equipment such as the cellular phone holder, a black box, a GPS, a clock, a speedmeter, the speaker, etc., may be coupled to the second arm member 520.

Further, an auxiliary lighting lamp control remote controller 620 controlling the actuation of the auxiliary lighting lamp unit 600 may be further included.

The auxiliary lighting lamp unit 600 is a lantern for camping or leisure as an example and may be turned on/off by the auxiliary lighting lamp control remote controller 620, may have a light amount which may be adjusted with 8 steps, and may have a strobo function as an example.

The auxiliary lighting lamp control remote controller 620 includes an on/off switch, a light amount adjustment switch, and a strobo on/off switch to control the actuation of the auxiliary lighting lamp unit 600.

Further, a power supply terminal 404 of the auxiliary lighting lamp is located in the Bluetooth speaker body 400 and the power supply terminal 404 of the auxiliary lighting lamp is a DC power jack as an example, and besides, it is turned out that various modifications can be made to a known power jack.

The power supply terminal 404 of the auxiliary lighting lamp may be connected to the rechargeable battery through the Bluetooth power supply first terminal 402 and may supply the power to the auxiliary lighting lamp unit 600 from the rechargeable battery.

That is, the auxiliary lighting lamp unit 600 includes a power supply line including a terminal which may be connected to the power supply terminal 404 of the auxiliary lighting lamp and is connected to the power supply terminal 404 of the auxiliary lighting lamp to receive the power.

In this case, the power is selectively supplied to the auxiliary lighting lamp unit 600 from the rechargeable battery by the control (on/off switch) of the auxiliary lighting lamp control remote controller 620.

The auxiliary lighting lamp unit 600 coupled to the second arm part 520 by the holder 610 includes an electric wire including a terminal which may be electrically connected to the power supply terminal 404 of the auxiliary lighting lamp and connected to the power supply terminal 404 of the auxiliary lighting lamp to receive the power from the rechargeable battery.

In the arm part 500, the first arm member 510 is rotated by the first hinge shaft 511 vertically coupled to the side of the Bluetooth speaker body 400 and the second arm member 520 is rotated by the second hinge shaft 521 located in a different direction from the first arm member 510 to locate the second arm member 520 on which the auxiliary lighting lamp unit 600 or the accessory equipment is mounted by adjusting the position of the second arm member 520 according to convenience of the user at the time of using the arm part 500.

The embodiment of the Bluetooth speaker body 400 will be described below in more detail.

Meanwhile, FIG. 3 is a bottom perspective view of the ascending/descending movement body part 200 in the multifunctional lighting apparatus for a bicycle according to the present invention and the multifunctional lighting apparatus for a bicycle according to the present invention may further include a cellular phone holding unit 700 located in the ascending/descending movement body part 200.

The cellular phone holding unit 700 includes a plurality of line members 710, 720, 730, and 740 which hangs and supports the cellular pone and has elasticity.

More specifically, the cellular phone holding unit 700 may include a first elastic line member 710 of which one end is connected to an upper portion side of the ascending/descending movement body part 200 and the other end is connected to one side of the ascending/descending movement body part 200, a second elastic line member 720 of which one end is connected to the upper portion side of the ascending/descending movement body part 200 and the other end is connected to the other side of the ascending/descending movement body part 200, a third elastic line member 730 of which one end is connected to a lower portion side of the ascending/descending movement body part 200 and the other end is connected to one side of the ascending/descending movement body part 200, and a fourth elastic line member 730 of which one end is connected to the lower portion side of the ascending/descending movement body part 200 and the other end is connected to the other side of the ascending/descending movement body part 200.

The line members, i.e., the first elastic line member 710, the second elastic line member 720, the third elastic line member 730, and the fourth elastic line member 740 may be elastically extended or lessened and are elastic lines having a strength to stably hold the cellular phone.

Further, the cellular phone holding unit 700 may further include a cellular phone holding coupling member 750 which is connected to one end of each of the third elastic line member 730 and the fourth elastic line member 740 and removably coupled to the ascending/descending movement body part 200.

A portable holding locking member insertion groove 203 into which the cellular phone holding coupling member 750 is inserted and coupled is located on a lower surface of the ascending/descending movement body part 200.

A suspension protrusion portion 203 is located to be projected on at one side of the inner surface of the cellular phone holding locking member insertion groove 203 and the outer surface of the cellular phone holding coupling member 750 and a suspension groove portion 751 into which the suspension protrusion portion 203a is inserted and suspended is located on the other side of the inner surface of the cellular phone holding locking member insertion groove 203 and the outer surface of the cellular phone holding coupling member 750.

The suspension protrusion portion 203a is located on the inner surface of the cellular phone holding locking member insertion groove 203 and the suspension groove portion 751 is located on the outer surface of the Bluetooth speaker body 400 as an example.

When the cellular phone holding coupling member 750 is inserted into the cellular phone holding locking member insertion groove 203, the suspension protrusion portion 203a fixes the position of the cellular phone holding coupling member 750 while being inserted into the suspension groove portion.

On the lower surface of the ascending/descending movement body part 200, the cellular phone holding locking member insertion groove 203, the lighting apparatus battery charging terminal 201 capable of charging the rechargeable battery, and the cellular phone charging power terminal 202 connected to the charging cable to use an internal rechargeable battery as the auxiliary battery are located, as an example.

Further, the cellular phone holding unit 700 may further include a first cellular phone holding rotation arm member 760 rotatably located on one surface of the ascending/descending movement body part 200 and connected to each of the other end of the first elastic line member 710 and the other end of the third elastic line member 730 and a second cellular phone holding rotation arm member 770 rotatably located on the other surface of the ascending/descending movement body part 200 and connected to each of the other end of the second elastic line member 720 and the other end of the fourth elastic line member 740.

The first cellular phone holding rotation arm member 760 and the second cellular phone holding rotation arm member 770 are unfolded to hold the cellular phone horizontally.

Figure 4:
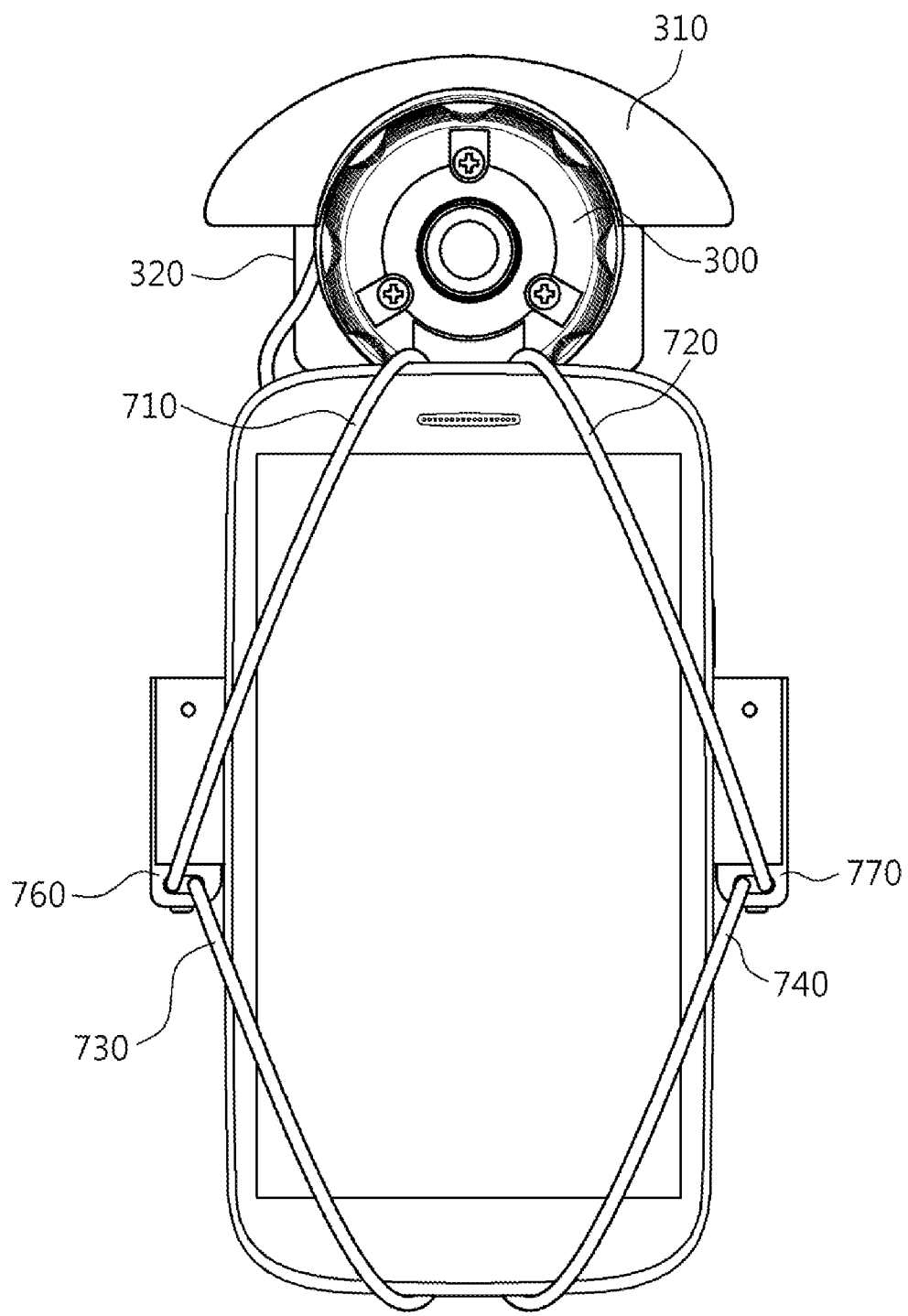
FIG. 4 is a diagram illustrating one use example of a cellular phone holding unit in the multifunctional lighting apparatus for a bicycle according to the present invention.

FIG. 4 is a diagram illustrating one use example of a cellular phone holding unit 700 in the multifunctional lighting apparatus for a bicycle according to the present invention and illustrates an example in which the cellular phone is vertically held by using the first elastic line member 710, the second elastic line member 720, the third elastic line member 730, and the fourth elastic line member 740.

Referring to FIG. 4, the cellular phone is suspended on both edges of the upper side of the cellular phone with the first elastic line member 710 and the second elastic line member 720, respectively while the cellular phone is vertically located on a rear surface of the ascending/descending movement body part 200 and the cellular phone holding coupling member 750 is inserted and coupled into the cellular phone holding locking member insertion groove 203 to suspend the third elastic line member 730 and the fourth elastic line member 740 onto both edge portions of the lower side of the cellular phone, respectively, thereby stably holding the cellular phone.

FIG. 5 is a diagram illustrating another use example of the cellular phone holding unit 700 in the multifunctional lighting apparatus for a bicycle according to the present invention and illustrates an example in which the cellular phone is horizontally held by using the first elastic line member 760 and the second elastic line member 770.

Figure 5A:
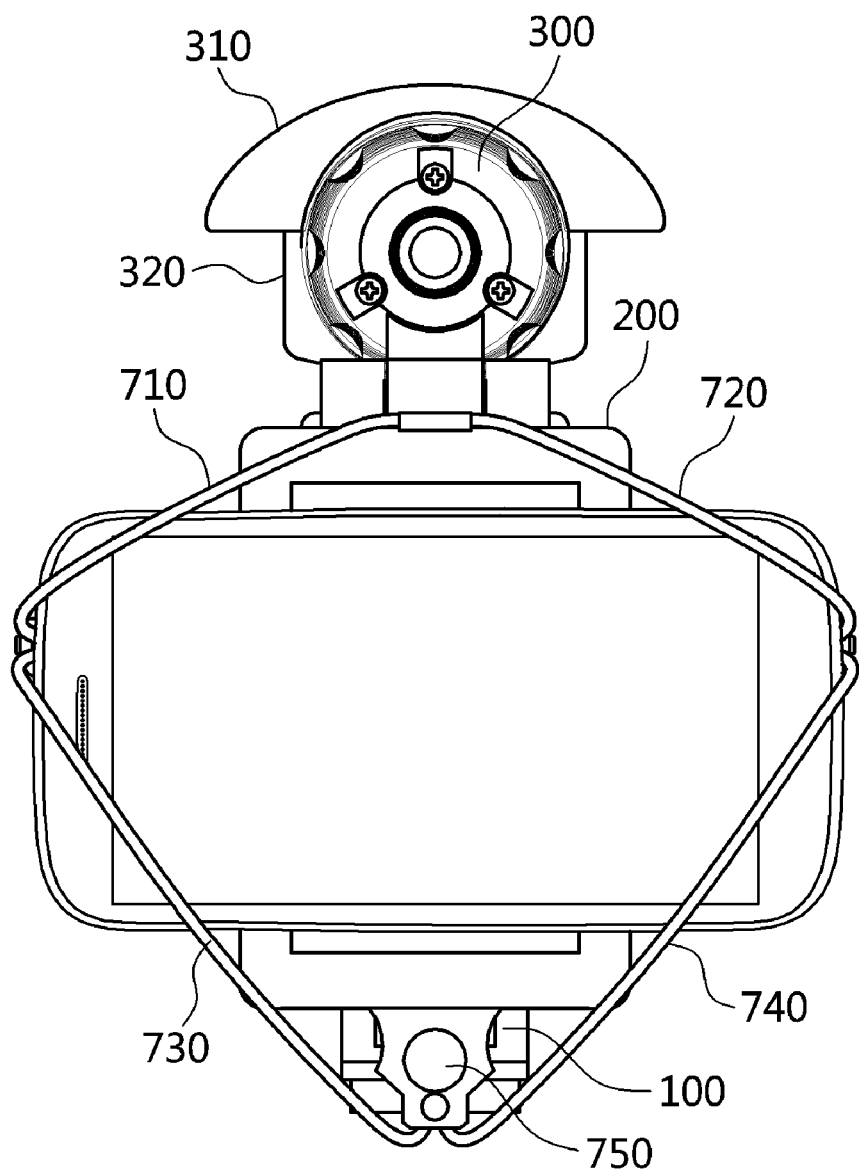
FIG. 5A and FIG. 5B are a diagram illustrating another use example of the cellular phone holding unit in the multifunctional lighting apparatus for a bicycle according to the present invention.
Figure 5B:
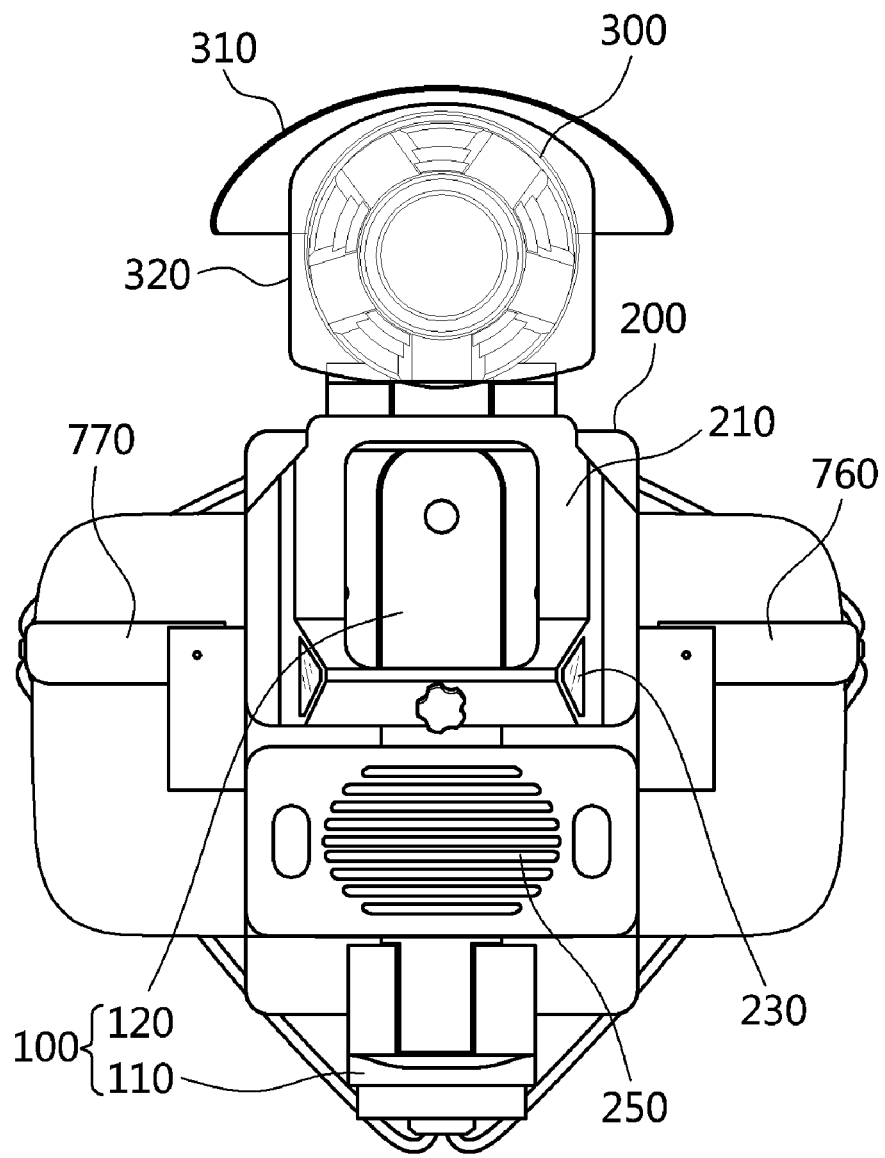

Referring to FIG. 5A and FIG. 5B, while the first elastic line member 760 and the second elastic line member 770 are unfolded and the cellular phone is horizontally located on the rear surface of the ascending/descending movement body part 200, the cellular phone is suspended on both edges of the upper side of the cellular phone with the first elastic line member 710 and the second elastic line member 720, respectively while the cellular phone is vertically located on a rear surface of the ascending/descending movement body part 200 and the cellular phone holding coupling member 750 is inserted and coupled into the cellular phone holding locking member insertion groove 203 to suspend the third elastic line member 730 and the fourth elastic line member 740 onto both edge portions of the lower side of the cellular phone, respectively, thereby stably holding the cellular phone.

In the case of the conventional cellular phone holder, by a scheme of pressing and fixing the cellular phone between two dampers, vibration generated according to a state of a road surface while the bicycle is being driven is deepened due to resonance vibration of the bicycle handle and teeth of a minute gear fixing the positions of the two dampers are released, and as a result, the cellular phone may be removed.

In the multifunctional lighting apparatus for a bicycle according to the present invention, the cellular phone holding unit 700 may stably hold the cellular phone without removing the cellular phone even in any vibration generated during driving of the bicycle by a scheme of closely attaching and fixing the cellular phone to the rear surface of the ascending/descending movement body part 200 by suspending four edge portions of the cellular phone with a plurality of line members which are the elastic lines, i.e., the first elastic line member 710 to the fourth elastic line member 740.

Figure 6:
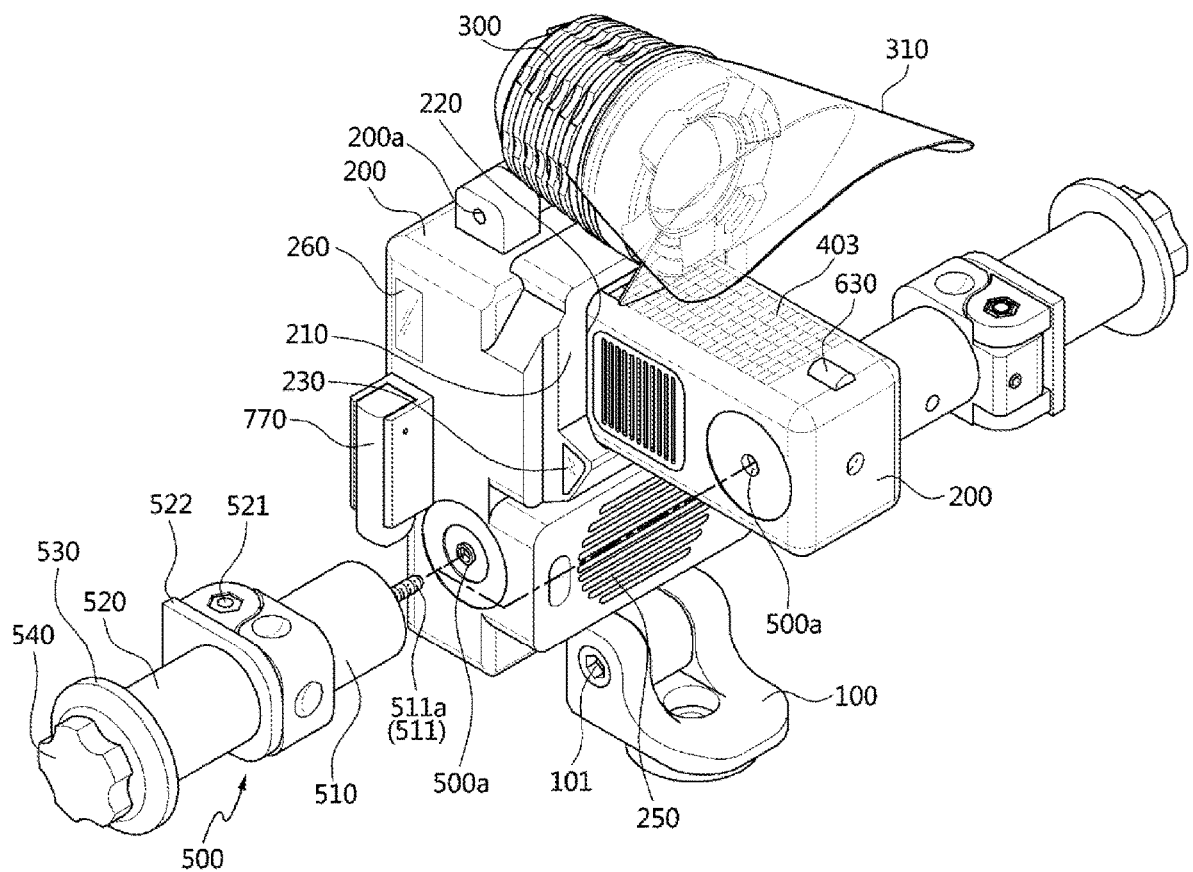
FIG. 6 is a perspective view illustrating an example of combing a Bluetooth speaker body with the ascending/descending movement body part in the multifunctional lighting apparatus for a bicycle according to the present invention.
Figure 7A:
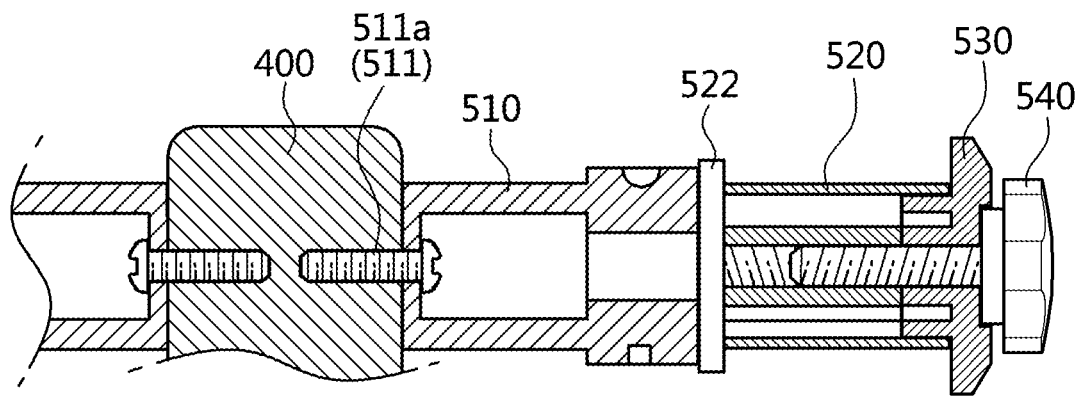
FIG. 7A and FIG. 7B are a cross-sectional view illustrating an embodiment of an arm part in the multifunctional lighting apparatus for a bicycle according to the present invention.

FIG. 6 is a perspective view illustrating an example of combing a Bluetooth speaker body 400 with the ascending/descending movement body part 200 in the multifunctional lighting apparatus for a bicycle according to the present invention and FIG. 7A is a cross-sectional view illustrating an embodiment of an arm part in the multifunctional lighting apparatus for a bicycle according to the present invention.

Referring to FIGS. 6 and 7, the multifunctional lighting apparatus for a bicycle according to the present invention may further include the arm part 500 on which the auxiliary lighting lamp unit 600 or another accessory equipment may be mounted and which is removably coupled to the ascending/descending movement body part 200.

A sound lighting unit 403 that emits light in response to an output sound may be located in the Bluetooth speaker body 400.

The sound lighting unit 403 is a spectrum lighting that emits the light in a wave form in response to the sound, i.e., according to a height of the sound.

The sound lighting unit 403 is located on the front surface of the Bluetooth speaker body 400 and emits the light in a colorful wave form to enhance a decorative beauty.

The arm part 500 may be used while being coupled to the ascending/descending movement body part 200 or the Bluetooth speaker body 400.

An arm coupling portion 500a to which the arm part 500 may be removably coupled may be located on a side surface of the ascending/descending movement body part 200 and the side surface of the Bluetooth speaker body 400.

The arm coupling portion 500a is a bolt fastening portion to which a hinge shaft bolt 511a of the arm part 500 is fastened as an example and the arm part 500 is fastened to a bolt fastening portion by the hinge shaft bolt 511*a* which is the first hinge shaft 511 which protrudes on one side of the first arm member 510 and rotatably located on the side surface of the ascending/descending movement body part 200 or the side surface of the Bluetooth speaker body 400.

In the second arm member 520, a holder stopper unit 522 coupled to the second arm member 520 and supporting one side of the auxiliary lighting lamp unit holder 610 to which the auxiliary lighting lamp unit 600 may be coupled may be located on one side of the second arm member 520 and the arm part may further include a holder pressing member 530 located on the other side of the second arm member 520 and pressing the other side of the auxiliary lighting lamp unit holder 610 and a holder fixing bolt member 540 fastened to the second arm member 520 through the holder pressing member 530.

The holder pressing member 530 pushes and presses the auxiliary lighting lamp unit holder 610 to which the auxiliary lighting lamp unit 600 may be coupled as the holder fixing bolt member 540 is fastened to the second arm member 520 to robustly fix the position of the auxiliary lighting lamp unit holder 610.

A bolt fastening space having the hinge shaft bolt 511*a* located therein and opened and opened to the other side is located in the first arm member 510.

In this case, a negative tolerance is formed to be provided between a male thread formed on an outer peripheral surface of the hinge shaft bolt 511*a* and a female thread formed on an inner peripheral surface of the arm coupling portion 500*a*, and as a result, even though one side of the first arm member 510 is coupled to the side surface of the ascending/descending movement body part 200 or the side surface of the Bluetooth speaker body 400 by the hinge shaft bolt 511*a*, coupling between the hinge shaft bolt 511*a* and the arm coupling portion 500*a* is prevented from being released even though the first arm member 510 is rotated with respect to the side surface of the ascending/descending movement body part 200 or the side surface of the Bluetooth speaker body 400 while being coupled by tight coupling by the negative tolerance of the male thread/female thread between the hinge shaft bolt 511*a* and the arm coupling portion 500*a*.

Figure 7B:
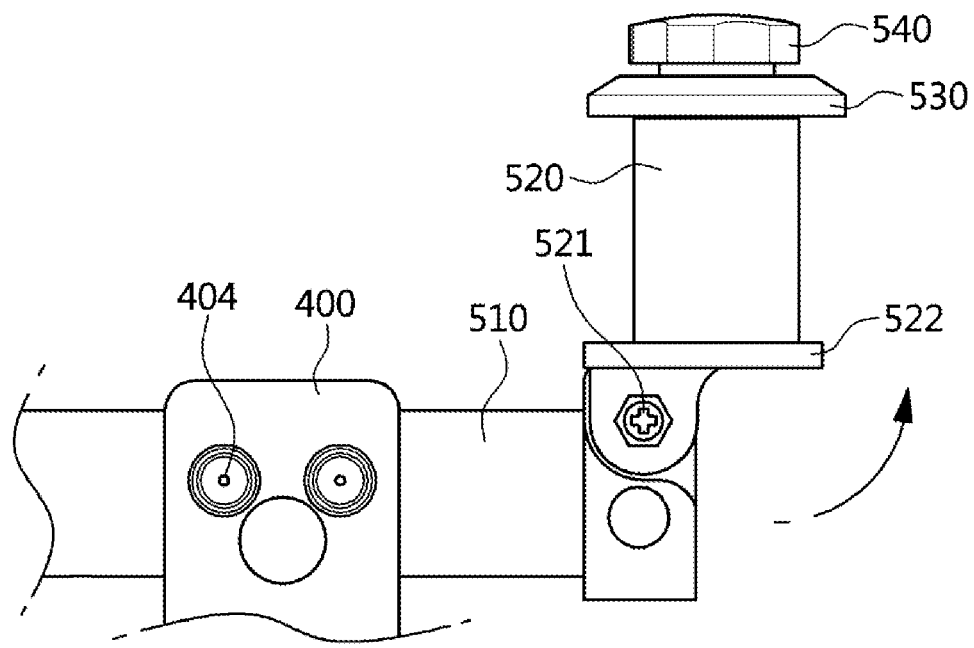

Referring to FIG. 7B, the bolt fastening space may be opened by rotating the second arm member 520 and while the other side of the bolt fastening space is opened by rotating the second arm member 520, the hinge shaft bolt 511*a* may be released or fastened by inserting a tool such as a driver into the bolt fastening space.

The arm part 500 is coupled to the Bluetooth speaker body 400 and the ascending/descending movement body part 200 to additionally mount and use the separate auxiliary lighting lamp unit 500 or accessory equipment.

Further, in the arm part 500 the first arm member 510 is rotated by the first hinge shaft 511, i.e., the hinge shaft bolt 511*a* vertically coupled to the side surface of the ascending/descending movement body part 200 or the side surface of the Bluetooth speaker body 400 and the second arm member 520 is rotated by the second hinge shaft 521 located in a different direction from the first arm member 510 to locate the second arm member 520 on which the accessory equipment is mounted by adjusting the position of the second arm member 520 according to convenience of the user at the time of using the arm part 500.

In the related art, in using the accessory equipment, it is not easy to operate the handle because the accessory equipment cannot but be installed in the handle of the bicycle and it is difficult to install all desired accessory equipments due to a limited space, and the accessory equipment is not aesthetically excellent.

Therefore, the multifunctional lighting apparatus for a bicycle according to an embodiment of the present invention includes the arm part 500 in which the separate accessory equipment may be installed to mount various accessory equipments required for driving the bicycle, and as a result, it is easy to operate the handle and various accessory equipments may be mounted out of a spatial limitation of a handle portion and since ancillary devices are installed in one place, and as a result, the multifunctional lighting apparatus is aesthetically excellent and convenience is also enhanced when the multifunctional lighting apparatus is used. Further, the ascending/descending movement body part 200 or the Bluetooth speaker body 400 to which the arm part 500 is attached is removed at once to resolve a difficulty of removing comforts accessory equipments) individually due to safety management after the existing bicycle driving.

Figure 8A:
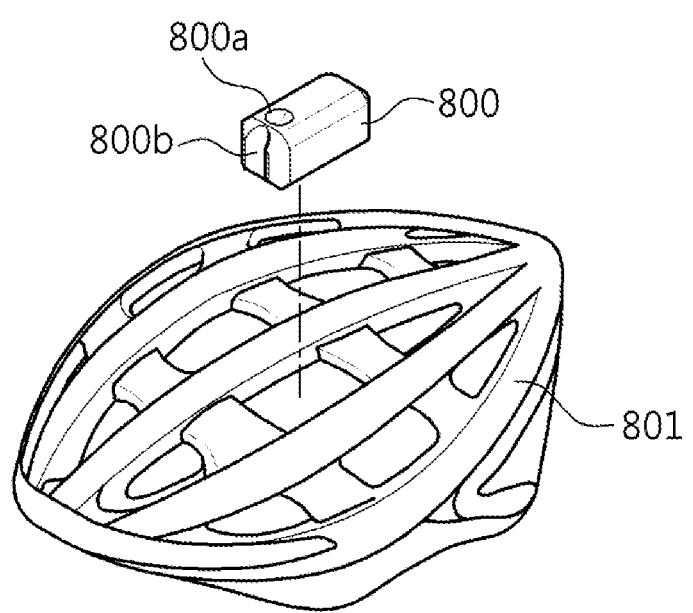
FIG. 8A and FIG. 8B are a diagram illustrating a gyro sensor body in the multifunctional lighting apparatus for a bicycle according to the present invention.
Figure 8B:
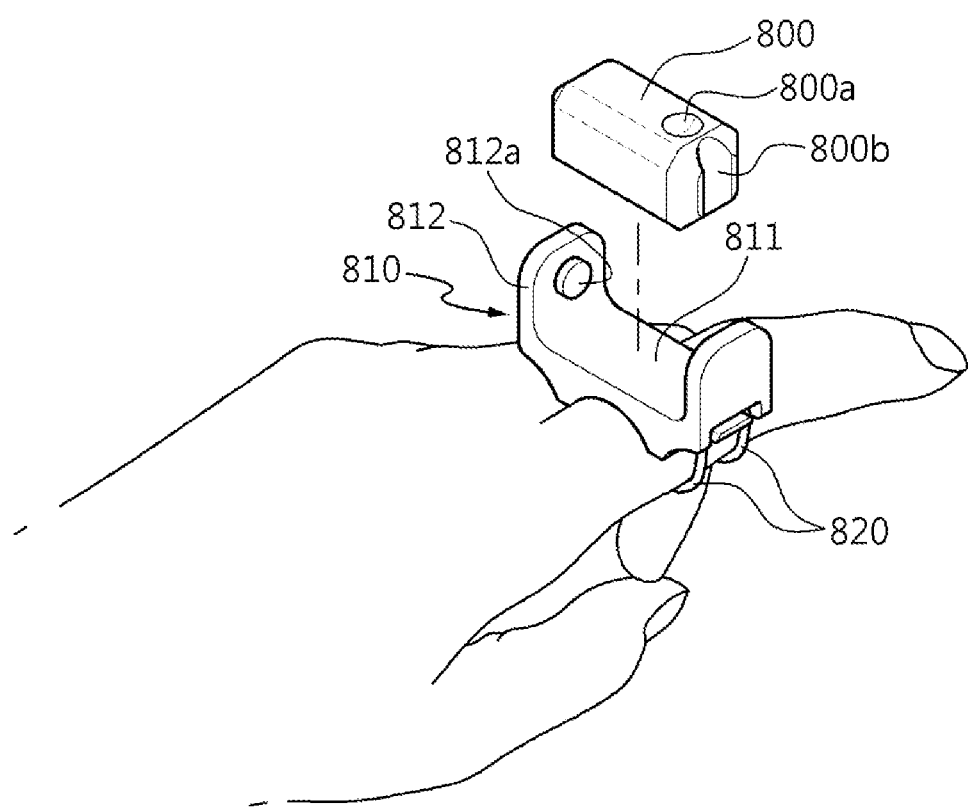

FIG. 8 is a diagram illustrating a gyro sensor body 800 in the multifunctional lighting apparatus for a bicycle according to the present invention, and FIG. 8A illustrates an example in which the gyro sensor body 800 is mounted on a helmet 801 worn by the deriver and FIG. 8B illustrates an example in which the gyro sensor body 800 is worn on a finger of the driver and used.

The multifunctional lighting apparatus for a bicycle according to the present invention may further include a gyro sensor body 800 which may include a gyro sensor capable of an inclination angle of the multifunctional lighting apparatus therein and may be worn by the driver of the bicycle.

In this case, the multifunctional lighting apparatus for a bicycle according to the present invention has a receiving unit which responds to a sensing signal transmitted from the gyro sensor body 800 embedded therein, and the receive sensing signal actuates an emergency light and a warning sound through a warning sound speaker unit 250 and an emergency lamp unit 260.

Referring to FIG. 1, the warning sound speaker unit 250 which communicates with the gyro sensor body 800 to receive a angle change sensed by the gyro sensor body 800 and output the warning sound and the emergency lamp unit 260 emitting the light may be provided in the ascending/descending movement body part 200.

The emergency lamp unit 260 may be located on each of the rear surface and the both side surfaces of the ascending/descending movement body part 200.

That is, even though the cellular phone is held on the rear surface of the ascending/descending movement body part 200 through the cellular phone holding unit 700, the driver may confirm an emergency state by light emission of the emergency lamp unit 260 located at both sides of the ascending/descending, movement body part 200.

When the inclination occurs at a predetermined angle or more, the gyro sensor body 800 senses the inclination and actuates the emergency lamp unit 260 and the warning sound speaker unit 250 to emit the light and generate the warning sound.

Referring to FIG. 8A, the gyro sensor body 800 may be inserted and mounted into a groove portion located in the helmet 801 worn by the driver.

In the gyro sensor body 800, the gyro sensor is located to be biased to one side in the longitudinal direction of a housing and a sensor horizontal position display groove portion 800*a* displaying a place where the gyro sensor is located is located on the outer surface of the housing.

The driver inserts and mounts the sensor horizontal position display groove portion 800*a* into the groove portion of the helmet 801 so that the sensor horizontal position display groove portion 800*a* faces the front of the helmet 801 and in the gyro sensor body 800, a front end of the housing where the sensor horizontal position display groove portion 800*a* is located is inclined forward, the emergency lamp unit 260 and the warning sound speaker unit 250 are actuated.

That is, the gyro sensor body 800 senses the inclination generated when a posture of the driver is lost by external shock and the driver does not stare in front thereof and looks in other directions while the driver travels while riding the bicycle and actuates the emergency lamp unit 260 and the warning sound speaker unit 250 and warns the driver to allow the driver to maintain a driving posture to a proper posture and safely continue driving.

Further, referring to FIG. 8B, the multifunctional lighting apparatus for a bicycle according to the present invention may further include a sensor wearing member 810 to which the gyro sensor body 800 is rotatably and removably coupled and in which an elastic wearing hand 820 to be worn in the figure of the driver is provided.

The sensor wearing member 810 may include a sensor seating unit 811 on which the gyro sensor body 800 is seated and a sensor coupling unit 812 erected on both ends of the sensor seating unit 811 and coupled to both ends of the gyro sensor body 800.

A sensor coupling protrusion portion 812*a* may be located on the inner surface of the sensor coupling portion 812 and a sensor fitting groove portion 800*b* to which the sensor coupling protrusion portion 812*a* may be located on each of both ends of the gyro sensor body 800.

The sensor fitting groove portion 800*b* is formed in a fitting groove form in which a lower portion is opened and in the gyro sensor body 800, the sensor coupling protrusion portion 812*a* is pushed from the upper portion to the lower portion between the sensor coupling protrusion portion 812*a* and the sensor coupling portion 812 and inserted is fitted into the sensor fitting groove portion 800*b* to rotatably couple the sensor coupling portion 812 to the sensor wearing member 810 axially.

In the sensor wearing member 810, an arc-shaped finger seating groove portion 810*a* which may be seated on the finger is located on the lower surface.

Further, the sensor wearing member 810 may be worn to cover the finger with the elastic wearing band 820 while the arc-shaped finger seating groove portion 810*a* is seated on the finger.

In this case, the gyro sensor body 800 is located in the horizontal direction while being coupled to the sensor wearing member 810 and the gyro sensor is located to be biased to one side (a right side based on the sensor horizontal position display groove portion 800*a* when being worn in the direction illustrated in FIG. 8B.

In the gyro sensor body 800, since the position of the sensor is displayed on the sensor horizontal position display groove portion 800*a*, it is turned out that the driver may confirm the sensor position.

Therefore, when the gyro sensor body 800 is worn on the finger and a user flexes the finger by gripping the handle, the gyro sensor is located to be biased to one side (the right side based on the sensor horizontal position display groove portion 800*a* when being worn in the direction illustrated in FIG. 8B) and maintained in a horizontal state to the ground and in this case, when the gyro sensor body 800 is inclined to the other one side (the left side based on the sensor horizontal position display groove portion 800*a* when being worn in the direction illustrated in FIG. 8B), the emergency lamp unit 260 and the warning sound speaker unit 250 are actuated.

That is, the gyro sensor body 800 worn on the finger senses the inclination generated when the driver operates the brake and actuates the emergency lamp unit 260 and the warning sound speaker unit 250 and generates the warning sound, thereby enhancing safety for nearby passers-by and bicycle drivers.

Figure 9:
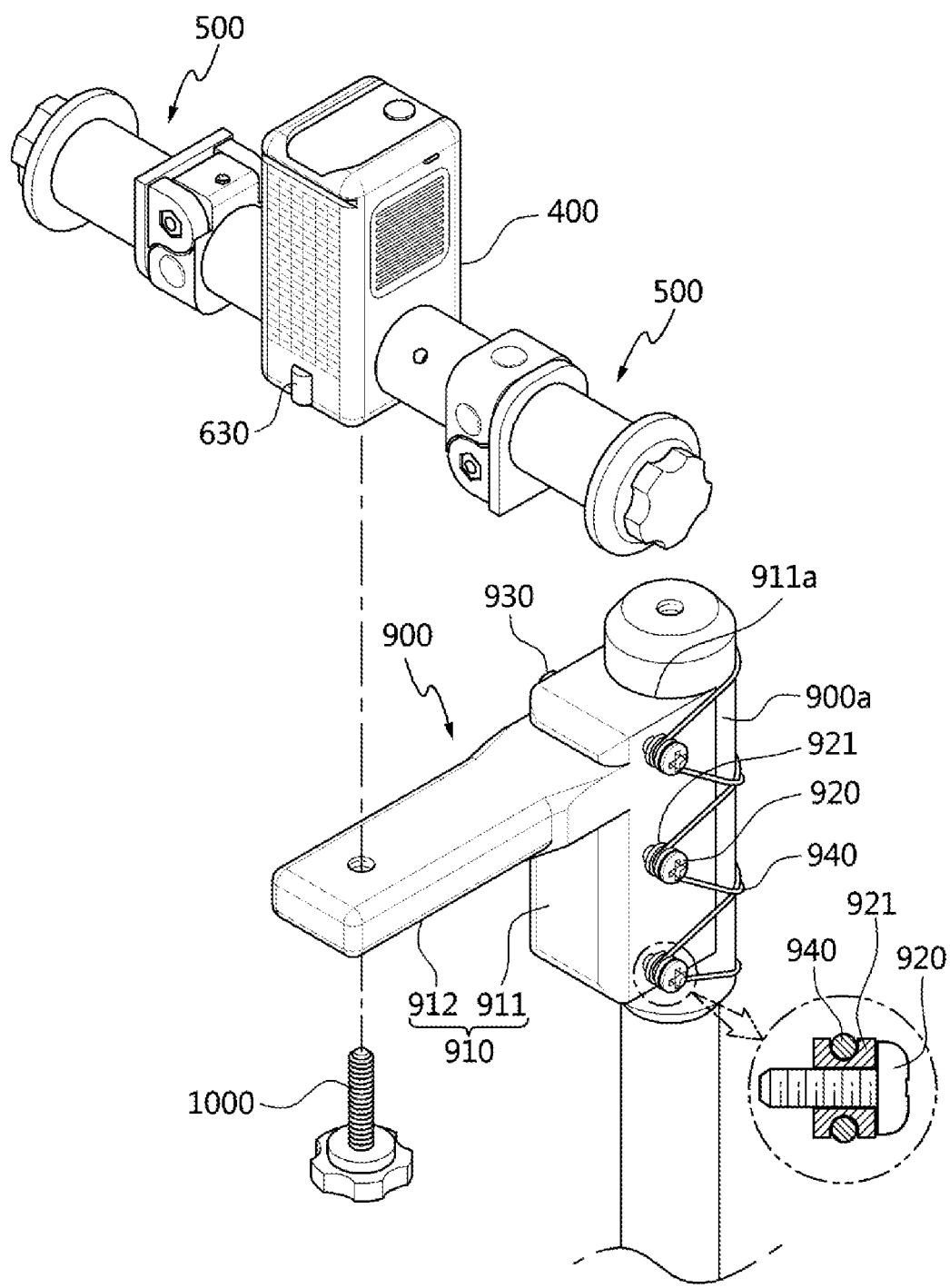
FIG. 9 is a diagram illustrating an example in which the Bluetooth speaker body is mounted on a support pipe of a tent or tarp used for camping and used the multifunctional lighting apparatus for a bicycle according to the present invention.

FIG. 9 is a diagram illustrating an example in which the Bluetooth speaker body 400 is mounted on a support pipe 900*a* of a tent or tarp used for camping and used the multifunctional lighting apparatus for a bicycle according to the present invention.

Referring to FIG. 9, the multifunctional lighting apparatus for a bicycle according to the present invention may further include a pipe holding unit 900 for mounting the Bluetooth speaker body 400 on the support pipe 900*a* of the tent or tarp.

The pipe holding unit 900 may include a pipe holding body member 910 in which an arc-shaped pipe mounting groove portion 911*a* covering a part of the outer surface of the support pipe 900*a* and the Bluetooth speaker body 400 is removably mounted, a first elastic line suspension member 920 which protrudes on one surface of the pipe holding body member 910 and is located to be erected in the vertical direction, a second elastic line suspension member 930 which protrudes on the other surface of the pipe holding body member 910 and is located to be erected in the vertical direction, and a pipe fixing line member 940 which is suspended on the first elastic line suspension member 920 and the second elastic line suspension member 930 and fixes the pipe holding body member 910 to the support pipe 900*a* by covering the remaining part of the outer surface of the support pipe 900*a*.

Further, the pipe holding unit 900 may further include a line suspension rotation roller member 921 which is rotatably located on each of the first elastic line suspension member 920 and the second elastic line suspension member 930 and includes a line insertion groove into which at least a part of the pipe fixing line member 940 is inserted and suspended.

The line suspension rotation roller member 921 is freely rotated around each of the first elastic line suspension member 920 and the second elastic line suspension member 930 in a structure in which the first elastic line suspension member 920 is penetrated and coupled and the second elastic line suspension member 930 is penetrated and coupled to evenly maintain a tension according to a suspension environment for the first elastic line suspension member 920 and the second elastic line suspension member 930 of the pipe fixing line member 940.

A line insertion groove of the line suspension rotation roller member 921 is a V-shaped or U-shaped groove as an example, and it is turned out that the line insertion groove may be variously modified and implemented in a form in which at least a part of the pipe fixing line member 940 may be inserted and suspended.

The pipe fixing line member 940 may be elastically stretched, and the pipe fixing line member 940 is an elastic line having a strength to closely attach and fix the pipe holding body member 910 to the support pipe 900*a*.

In addition, the pipe holding body member 910 may include a pipe mounting portion 911 where the arc-shaped pipe mounting groove portion 911*a* covering a part of the outer surface of the support pipe 900*a* is located and a speaker support portion 912 which vertically protrudes on the pipe mounting portion 911 and on which the Bluetooth speaker body 400 is mounted.

The pipe holding body member 910 may be selected and used as a member which is fabricated in various forms having the pipe mounting groove portion 911a corresponding to the diameters of various support pipes 900a and has a form suitable for the corresponding support pipe 900a.

A bolt penetration hole through which a speaker mounting bolt 1000 may be located in the speaker support portion 912 and a speaker mounting fastening portion to which the speaker mounting bolt 1000 is fastened may be located in the Bluetooth speaker.

A bolt handle portion having a plurality of grooves located on the outer surface may be located on a head portion of the speaker mounting bolt 1000 so as to easily fasten and release the bolt.

The pipe holding body member 910 may be mounted on the support pipe 900a by alternately suspending the pipe fixing line member 940 on the line suspension rotation roller member 921 of the first elastic line suspension member 920 and the line suspension rotation roller member 921 of the second elastic line suspension member 930 while being closely attached to the support pipe 900a.

In addition, the Bluetooth speaker body 400 may be fastened and held onto the pipe holding body member 910 mounted on the support pipe 900a.

That is, the Bluetooth speaker body 400 is mounted on the support pipe 900a of the tent or tarp used for camping through the pipe holding unit 900 to be conveniently held and used outdoors.

Figure 10:
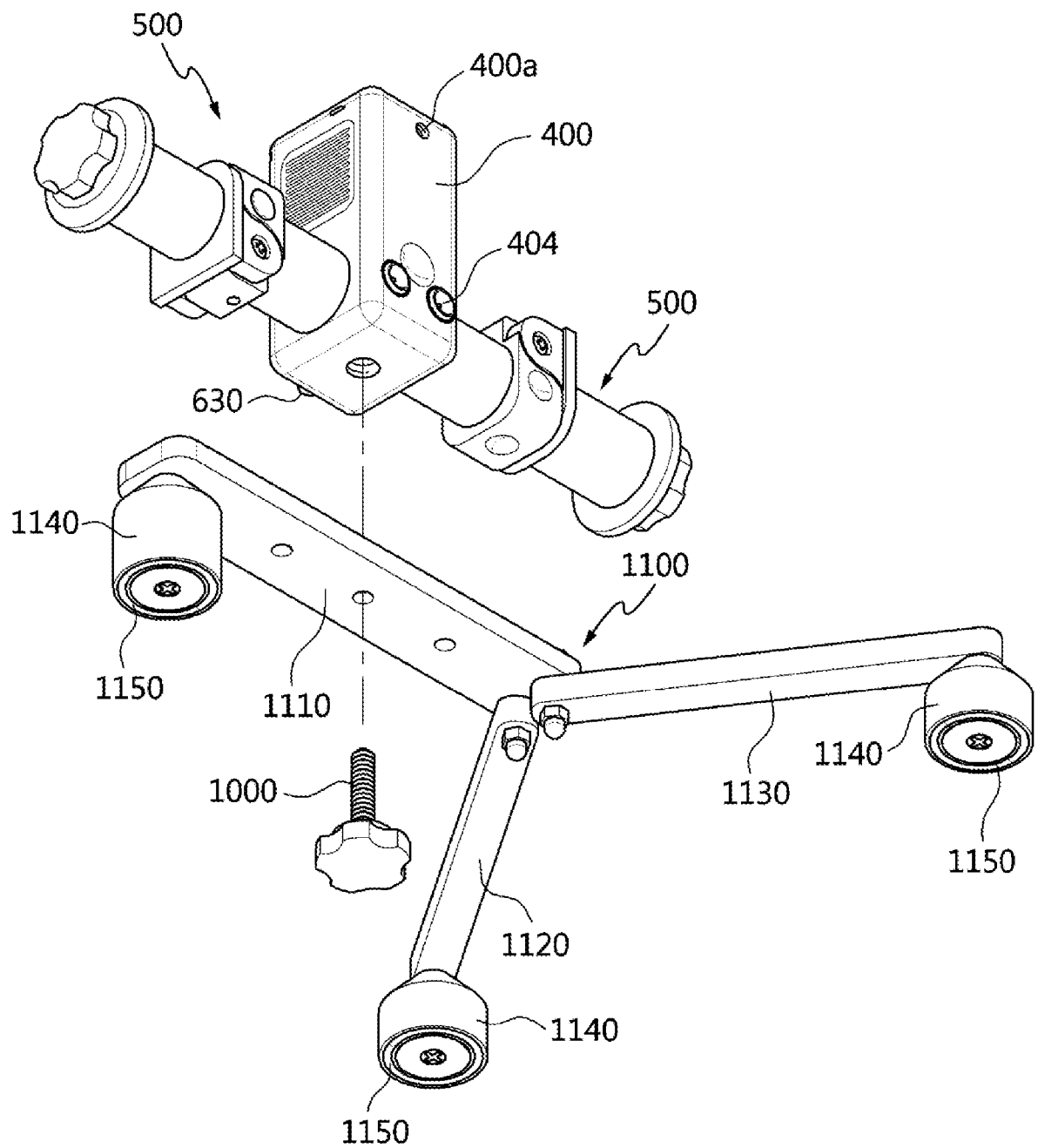
FIG. 10 is a diagram illustrating an example in which the Bluetooth speaker body is mounted on a vehicle and used in the multifunctional lighting apparatus for a bicycle according to the present invention.

FIG. 10 is a bottom perspective view illustrating an example of a folding-type non-contact magnetic holder 1100 so as to mount and use the Bluetooth speaker body 400 on the vehicle in the multifunctional lighting apparatus for a bicycle according to the present invention.

Referring to FIG. 10, the multifunctional lighting apparatus for a bicycle according to the present invention may further include a folding-type non-contact magnetic holder 1100 which may attach and use the Bluetooth speaker body 400 by a magnetic force.

A folding-type non-contact magnetic holder 1100 may include a base member 1110 in which a plurality of bolt penetration holes through which the speaker mounting bolt 1000 is penetrated is located to be spaced apart from each other, a first rotation member 1120 and a second rotation member 1130 rotatably connected to the base member 1110, and a magnetic attachment member 1140 which is located in each of the base member 1110, the first rotation member 1120, and the second rotation member 1130 and includes a magnet to be attached by the magnetic force.

When the first rotation member 1120 and the second rotation member 1130 are unused, the first rotation member 1120 and the second rotation member 1130 are located and stored to be overlapped with the base member 1110 and when the first rotation member 1120 and the second rotation member 1130 are used, while the first rotation member 1120 and the second rotation member 1130 are rotated and unfolded, each other, the first rotation member 1120 and the second rotation member 1130 may be attached to an attachable location by the magnetic force of the magnet attachment member, i.e., a bonnet of the vehicle or a roof of the vehicle.

The folding-type non-contact magnetic holder 1100 may further include an elastic-material elastic support ring member 1150 which is located on the lower surface of the magnetic attachment member 1140 to separate the lower surface of the magnetic attachment member 1140 from an attachment surface.

The elastic-material elastic support ring member 1150 serves to prevent a damage such as a scratch on the bonnet of the vehicle or the roof of the vehicle and prevent slipping by separating the lower surface of the magnetic attachment member 1140 from the attachable position by the magnetic force, i.e., the bonnet of the vehicle or the roof of the vehicle.

The folding-type non-contact magnetic holder 1100 may be attached to the attachable position of the magnetic attachment member 1140 located in each of the base member 1110, the first rotation member 1120, and the second rotation member 1130 by the magnetic force, i.e., the bonnet of the vehicle or the roof of the vehicle by unfolding the first rotation member 1120 and the second rotation member 1130.

The Bluetooth speaker body 400 may be fastened to the speaker mount bolt 1000 passing through any one hole among a plurality of bolt penetration holes of the base member 1110 and located and held on the base member.

That is, the folding-type non-contact magnetic holder 1100 is attached to the bonnet or roof of the vehicle by the magnetic force and the Bluetooth speaker body 400 is then fastened and held onto the folding-type non-contact magnetic holder 1100 by means of the folding the speaker mounting bolt 1000, and as a result, the Bluetooth speaker body 400 may be conveniently held and used outdoors.

According to the present invention, a multifunctional lighting apparatus can be selectively mounted on a handle stem of a bicycle and a lighting lamp unit can be located at a position desired by a driver by adjusting a height of the lighting lamp unit, thereby enhancing both satisfaction and safety in use.

According to the present invention, since a cellular phone can be stably held without flowing during bicycle driving and the held cellular phone can be charged with an embedded rechargeable battery, both the convenience and the stability can be enhanced when using the cellular phone.

According to the present invention, the posture of the driver is unstable during driving in link with the gyro sensor body 800 or when the brake is actuated, the stability during the driving is significantly enhanced by notifying with light or sound.

According to the present invention, since the Bluetooth speaker body 400 can be selectively mounted and used and power can be supplied to the Bluetooth speaker body 400 with an embedded rechargeable battery, satisfying various requirements of the driver.

According to the present invention, the speaker support body capable of simply installing the Bluetooth speaker body 400 on the support pipe 900a of the tent or tarp used for camping or the vehicle is provided to enhance the usability and easy of user of the Bluetooth speaker body 400 outdoors like the camping.

As described above, the optimal embodiment is disclosed in the drawings and the specification. Although specific terms have been used herein, the terms are only used for the purpose of describing the present invention and are not used to limit the scope of the present invention as defined in the claims. Therefore, it will be appreciated by those skilled in the art that various modifications and other embodiments equivalent thereto can be made therefrom. Accordingly, the true technical scope of the present invention should be defined by the technical spirit of the appended claims.

The invention claimed is:

1. A multifunctional lighting apparatus for a bicycle, comprising:
   a lighting apparatus ascending/descending support unit detachably mounted on a steering unit of a bicycle;
   an ascending/descending movement body part vertically movably located on the lighting apparatus ascending/descending support unit;
   a main lighting lamp unit located on the ascending/descending movement body part and irradiating light; and
   a Bluetooth speaker body detachably coupled to the ascending/descending movement body part,
   wherein a coupling portion to which the lighting apparatus ascending/descending support unit is detachably coupled is located on a front surface of the ascending/descending movement body part, an ascending/descending movement path to which the lighting apparatus ascending/descending support unit is movably coupled in a vertical direction is located in the coupling portion, and an opening portion for exposing a part of the lighting apparatus ascending/descending support unit moved on the ascending/descending movement path is located on the front surface, and
   the Bluetooth speaker body is inserted into the opening portion and coupled to the ascending/descending movement body part.

2. The multifunctional lighting apparatus for a bicycle of claim 1, wherein the lighting apparatus ascending/descending support unit includes a bicycle handle stem mounting member detachably mounted on a stem of the steering unit and a frame member rotatably located in the bicycle handle stem mounting member and erected and laid down and movably coupled with the ascending/descending movement body part,
   a main mounting hole penetrated by a stem mounting bolt fastened to the stem is located in the bicycle handle stem mounting member, and
   the main mounting hole has the same diameter as the stem mounting bolt and is formed by a fastening hole in which female thread tapping which may be fastened to a camera coupling bolt of a camera tripod is formed.

3. The multifunctional lighting apparatus for a bicycle of claim 1, wherein a rechargeable battery supplying power to the main lighting lamp unit is located in the ascending/descending movement body part.

4. The multifunctional lighting apparatus for a bicycle of claim 1, wherein a handle lighting lamp unit irradiating the light to the steering unit is provided in the ascending/descending movement body part.

5. The multifunctional lighting apparatus for a bicycle of claim 1, wherein a rechargeable battery supplying power to the main lighting lamp unit is located in the ascending/descending movement body part, and
   the Bluetooth speaker body is coupled to the ascending/descending movement body part and electrically connected to the rechargeable battery to receive the power from the rechargeable battery.

6. The multifunctional lighting apparatus for a bicycle of claim 1, wherein a sound lighting unit which emits light in response to an output sound is located in the Bluetooth speaker body, and
   the sound lighting unit is a spectrum lighting emitting the light in a wave form in response the sound.

7. The multifunctional lighting apparatus for a bicycle of claim 1, wherein a Bluetooth coupling protrusion portion is located to protrude on any one side of an inner surface of the opening portion and an outer surface of the Bluetooth speaker body and a Bluetooth coupling groove portion into which the Bluetooth coupling protrusion portion is inserted and suspended is located on the other side of the inner surface of the opening portion and the outer surface of the Bluetooth speaker body.

8. The multifunctional lighting apparatus for a bicycle of claim 1, further comprising:
   a speaker fixation bolt fastened to a fastening hole slantly located in the ascending/descending movement body part and slantly located and pressing the outer surface of the Bluetooth speaker body coupled to the opening portion to fix a position of the Bluetooth speaker body.

9. The multifunctional lighting apparatus for a bicycle of claim 1, wherein in the Bluetooth speaker body, a Bluetooth power supply first terminal is located on the outer surface and a Bluetooth power supply second terminal connected to the Bluetooth power supply first terminal and connecting the power of the rechargeable battery located in the ascending/descending movement body part to the Bluetooth speaker body is located on the inner surface of the opening portion.

10. The multifunctional lighting apparatus for a bicycle of claim 9, wherein a power supply terminal of an auxiliary lighting lamp is located in the Bluetooth speaker body, and
    the power supply terminal of the auxiliary lighting lamp is connected to the rechargeable battery through the Bluetooth power supply first terminal and selectively supply the power to an auxiliary lighting lamp unit from the rechargeable battery by a control of an auxiliary lighting lamp control remote controller.

11. The multifunctional lighting apparatus for a bicycle of claim 1, further comprising:
    a cellular phone holding unit located in the ascending/descending movement body part,
    wherein the cellular phone holding unit includes a plurality of line members having elasticity so as to hang and support a cellular phone.

12. The multifunctional lighting apparatus for a bicycle of claim 11, wherein the cellular phone holding unit includes
    a first elastic line member of which one end is connected to an upper portion side of the ascending/descending movement body part and the other end is connected to one side of the ascending/descending movement body part,
    a second elastic line member of which one end is connected to the upper portion side of the ascending/descending movement body part and the other end is connected to the other side of the ascending/descending movement body part,
    a third elastic line member of which one end is connected to a lower portion side of the ascending/descending movement body part and the other end is connected to one side of the ascending/descending movement body part,
    a fourth elastic line member of which one end is connected to the lower portion side of the ascending/descending movement body part and the other end is connected to the other side of the ascending/descending movement body part, and
    a cellular phone holding coupling member which is connected to one end of each of the third elastic line member and the fourth elastic line member and detachably coupled to the ascending/descending movement body part.

13. The multifunctional lighting apparatus for a bicycle of claim 12, wherein a portable holding locking member insertion groove into which the cellular phone holding coupling member is inserted and coupled is located on a lower surface of the ascending/descending movement body part, and a suspension protrusion portion is located to be projected on at one side of the inner surface of the cellular phone holding locking member insertion groove and the outer surface of the cellular phone holding coupling member and a suspension groove portion into which the suspension protrusion portion is inserted and suspended is located on the other side of the inner surface of the cellular phone holding locking member insertion groove and the outer surface of the cellular phone holding coupling member.

14. The multifunctional lighting apparatus for a bicycle of claim 13, wherein the cellular phone holding unit further includes a first cellular phone holding rotation arm member rotatably located on one surface of the ascending/descending movement body part and connected to each of the other end of the first elastic line member and the other end of the third elastic line member, and a second cellular phone holding rotation arm member rotatably located on the other surface of the ascending/descending movement body part and connected to each of the other end of the second elastic line member and the other end of the fourth elastic line member.

15. The multifunctional lighting apparatus for a bicycle of claim 13, further comprising:

an arm part on which an auxiliary lighting lamp unit or another accessory equipment may be mounted and which is removably coupled to the ascending/descending movement body part.

16. The multifunctional lighting apparatus for a bicycle of claim 15, wherein the arm part includes a first arm member rotatably axially coupled to a side surface of the ascending/descending movement body part or the Bluetooth speaker body by a first hinge shaft and a second arm member rotatably connected to the first arm member by a second hinge axis located in a different direction from the first hinge shaft, a holder stopper unit supporting one side of an auxiliary lighting lamp unit holder coupled to the second arm member and supporting one side of an auxiliary lighting lamp unit holder to which an auxiliary lighting lamp unit may be coupled is located on one side of the second arm member, and the arm part further includes a holder pressing member located on the other side of the second arm member and pressing the other side of the auxiliary lighting lamp unit holder to fix the position, and a holder fixing bolt member fastened to the second arm member through the holder pressing member.

17. The multifunctional lighting apparatus for a bicycle of claim 16, wherein the first hinge shaft is a hinge shaft bolt which protrudes on one side of the first arm member and fastened a bolt fastening portion located on the side surface of the ascending/descending movement body part or the side surface of the Bluetooth speaker body, and in the first arm member, the hinge shaft bolt is located and a bolt fastening space opened to the other side is located and the bolt fastening space is opened by rotating the second arm member.

18. The multifunctional lighting apparatus for a bicycle of claim 1, further comprising:

a gyro sensor body which includes a gyro sensor capable of sensing an inclination angle therein and which may be worn by a driver of the bicycle;

a warning sound speaker unit which is located in the ascending/descending movement body part and communicates with the gyro sensor body and receives an angle change sensed by the gyro sensor body and outputs a warning sound; and an emergency lamp unit which is located in the ascending/descending movement body part and communicates with the gyro sensor body and receives the angle change sensed by the gyro sensor body and emits the light.

19. The multifunctional lighting apparatus for a bicycle of claim 18, wherein in the gyro sensor body, the gyro sensor is located to be biased to one side in the longitudinal direction of a housing and a sensor horizontal position display groove portion displaying a place where the gyro sensor is located is located on the outer surface of the housing.

20. The multifunctional lighting apparatus for a bicycle of claim 18, further comprising:

a sensor wearing member to which the gyro sensor body is rotatably and removably coupled and in which an elastic wearing band to be worn in the figure of the driver is provided, wherein in the sensor wearing member, an arc-shaped finger seating groove portion which may be seated on the finger is located on the lower surface.

21. The multifunctional lighting apparatus for a bicycle of claim 1, further comprising:

a pipe holding unit for mounting the Bluetooth speaker body on a support pipe of a tent or tarp.

22. The multifunctional lighting apparatus for a bicycle of claim 21, wherein the pipe holding unit includes a pipe holding body member in which an arc-shaped pipe mounting groove portion covering a part of the outer surface of the support pipe and the Bluetooth speaker body is removably mounted, a first elastic line suspension member which protrudes on one surface of the pipe holding body member and is located to be erected in the vertical direction, a second elastic line suspension member 930 which protrudes on the other surface of the pipe holding body member 910 and is located to be erected in the vertical direction, and a pipe fixing line member which is suspended on the first elastic line suspension member and the second elastic line suspension member and fixes the pipe holding body member to the support pipe by covering the remaining part of the outer surface of the support pipe.

23. The multifunctional lighting apparatus for a bicycle of claim 1, further comprising:

a folding-type non-contact magnetic holder, wherein the Bluetooth speaker body is magnetically attached to the folding-type non-contact magnetic holder.

24. The multifunctional lighting apparatus for a bicycle of claim 23, wherein a folding-type non-contact magnetic holder includes a base member in which a plurality of bolt penetration holes through which the speaker mounting bolt is penetrated is located to be spaced apart from each other, a first rotation member and a second rotation member rotatably connected to the base member, a magnetic attachment member which is located in each of the base member, the first rotation member, and the second rotation member and includes a magnet to be attached by the magnetic force, and an elastic-material elastic support ring member which is located on the lower surface of the magnetic attachment member to separate the lower surface of the magnetic attachment member from an attachment surface.

25. The multifunctional lighting apparatus for a bicycle of claim 10, wherein a wireless control receiving window which receives a transmission signal from the auxiliary lighting lamp control remote controller and controls actuation of the auxiliary lighting lamp unit is located in the Bluetooth speaker body.

* * * * *